(12) United States Patent
Lewbel et al.

(10) Patent No.: US 11,262,886 B2
(45) Date of Patent: Mar. 1, 2022

(54) STRUCTURED ARRANGEMENTS FOR TRACKING CONTENT ITEMS ON A SHARED USER INTERFACE

(71) Applicant: MICROSOFT TECHNOLOGY LICENSING, LLC, Redmond, WA (US)

(72) Inventors: Hannah Rebecca Lewbel, Kirkland, WA (US); Isabel Sophie Sharp, Seattle, WA (US); Adam Michael Gleisner, Seattle, WA (US); Lindsey Conway, Seattle, WA (US); Clea Allington, Seattle, WA (US); Minu George, Sammamish, WA (US); Samantha Robbie Courts, Bellevue, WA (US); Margaret Arlene Grounds, Kirkland, WA (US); Scott H. W. Snyder, Seattle, WA (US); Nassr Albahadly, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 16/660,744

(22) Filed: Oct. 22, 2019

(65) Prior Publication Data
US 2021/0117050 A1  Apr. 22, 2021

(51) Int. Cl.
*G06F 3/0482* (2013.01)
*G06F 3/0483* (2013.01)
*G06F 3/14* (2006.01)

(52) U.S. Cl.
CPC .......... *G06F 3/0482* (2013.01); *G06F 3/1454* (2013.01); *G06F 2203/04803* (2013.01)

(58) Field of Classification Search
CPC ............................ G06F 3/04842; G06F 21/64
See application file for complete search history.

(56) References Cited

U.S. PATENT DOCUMENTS 8,099,458 B2  1/2012  Burtner et al.
9,082,106 B2  7/2015  Jones et al.
(Continued)

FOREIGN PATENT DOCUMENTS

WO  2016100413 A1  6/2016

OTHER PUBLICATIONS

"Final Office Action Issued in U.S. Appl. No. 16/377,940", dated Jun. 11, 2020, 18 Pages.
(Continued)

*Primary Examiner* — Rayeez R Chowdhury
(74) *Attorney, Agent, or Firm* — Benjamin Keim; Newport IP, LLC

(57) ABSTRACT

Technologies are disclosed that enable a computing system to present a structured arrangement for tracking content items on a shared user interface (UI) during a communication session. The structured arrangement is a list that is displayed in a specific region of the shared UI. Inclusion of content items in the list makes it easier for users to locate and interact with those content items throughout the communication session. The ability to create and manipulate the list may be limited to only certain users such as a moderator. Use of this list can promote inclusivity and fairness. For instance, inclusion in the list may prevent content items from being forgotten or ignored. Additionally, the names of users who contributed the content items may be shown in the list thereby providing recognition for those users.

20 Claims, 14 Drawing Sheets

(56) References Cited

U.S. PATENT DOCUMENTS

| | | |
|---|---|---|
| 10,126,927 B1 | 11/2018 | Fieldman |
| 2003/0189598 A1 | 10/2003 | Lipstein et al. |
| 2004/0025113 A1* | 2/2004 | Penke .................. G06F 16/93 715/273 |
| 2006/0031235 A1* | 2/2006 | Foresti ................. G06F 16/907 |
| 2006/0224430 A1 | 10/2006 | Butt |
| 2008/0022209 A1 | 1/2008 | Lyle |
| 2009/0052645 A1 | 2/2009 | Bansal et al. |
| 2009/0234721 A1 | 9/2009 | Bigelow et al. |
| 2010/0251153 A1* | 9/2010 | SanGiovanni ...... G06F 3/04842 715/767 |
| 2011/0078573 A1* | 3/2011 | Ooba ..................... G06F 9/451 715/733 |
| 2011/0268262 A1 | 11/2011 | Jones et al. |
| 2013/0091440 A1 | 4/2013 | Kotler |
| 2013/0191454 A1* | 7/2013 | Oliver .................. G06F 16/639 709/204 |
| 2014/0012614 A1* | 1/2014 | Beresford-Wood ... G06Q 40/12 705/7.15 |
| 2014/0082100 A1 | 3/2014 | Sammon et al. |
| 2015/0002435 A1 | 1/2015 | Shimizu et al. |
| 2015/0213395 A1 | 7/2015 | Swanson et al. |
| 2015/0341399 A1 | 11/2015 | Lee |
| 2016/0085381 A1* | 3/2016 | Parker .................. G06F 3/1454 715/753 |
| 2016/0321227 A1 | 11/2016 | Keslin et al. |
| 2017/0090852 A1* | 3/2017 | Harada ................. G06F 3/1454 |
| 2018/0039951 A1 | 2/2018 | Wynn et al. |
| 2018/0060018 A1* | 3/2018 | Kunakhovich ....... G06F 3/1454 |
| 2019/0013955 A1 | 1/2019 | Yoo |
| 2020/0319778 A1 | 10/2020 | Lewbel et al. |
| 2021/0073743 A1 | 3/2021 | Fox et al. |

OTHER PUBLICATIONS

"International Search Report and Written Opinion Issued in PCT Application No. PCT/US2020/024350", dated Jun. 12, 2020, 11 Pages.

"Non-Final Office Action Issued in U.S. Appl. No. 16/377,940", dated Sep. 29, 2020, 18 Pages.

"Non-Final Office Action Issued in U.S. Appl. No. 16/377,940", dated Mar. 6, 2020, 16 Pages.

"International Search Report and the Written Opinion Issued in PCT Application No. PCT/US20/052988", dated Dec. 23, 2020, 12 Pages.

"International Search Report and the Written Opinion Issued in PCT Application No. PCT/US20/052989", dated Jan. 18, 2021, 17 Pages.

"International Search Report and Written Opinion Issued in PCT Application No. PCT/US2020/052987", dated Mar. 10, 2021, 23 Pages.

"Non Final Office Action Issued in U.S. Appl. No. 16/660,763", dated Jul. 29, 2021, 32 Pages.

"Administrator Guide to Cisco Webex Room Kit", Retrieved from: https://www.cisco.com/c/dam/en/us/td/docs/telepresence/endpoint/ce94/room-kit-administrator-guide-ce94.pdf, Jun. 2018, 188 Pages.

"Webex Frequently Asked Questions", Retrieved From: https://www.jmu.edu/computing/_files/WebEX_Outlook_FaQ.pdf, 2018, 77 Pages.

"Notice of Allowance Issued in U.S. Appl. No. 16/660,678", dated Sep. 1, 2021, 15 Pages.

"Final Office Action Issued in U.S. Appl. No. 16/660,763", dated Nov. 23, 2021, 38 Pages.

* cited by examiner

STRUCTURED ARRANGEMENTS FOR TRACKING CONTENT ITEMS ON A SHARED USER INTERFACE

BACKGROUND

Computer systems for facilitating communication sessions frequently include a shared user interface (UI) on which multiple users can jointly interact. Users can add content items to the shared UI and manipulate content items provided by themselves or others. In one example, a shared UI for co-located users may be a digital whiteboard with a large touch screen. Content added to the digital whiteboard can be shared with other remote users. The remote users may access the shared UI and interact with the content through a shared canvas that is reproduced on remote computing devices. Computing systems that allow users to jointly interact on a shared UI during a communication session have improved greatly over the years.

Although there have been improvements, some existing technologies still present a number of drawbacks. For instance, a shared UI may make it difficult for users to organize content items leading to difficulty in locating specific content items. For example, a moderator may wish to return to a content item that she saw earlier on the shared UI. However, if the content item has been moved or renamed by another user, the moderator may not be able to easily locate that content item. This makes it more difficult for the moderator to obtain the information she needs from the computing device. The moderator may be required to perform a manual search for the content or initiate different forms of communication with other users to locate the desired content. This, in turn, can lead to a number of inefficiencies with respect to the use of computing resources such as processor cycles, memory, and network bandwidth.

It is with respect to these and other considerations the disclosure made herein is presented.

SUMMARY

The technologies disclosed herein provide a system that enables users to group and track content items on a shared UI by creating a structured arrangement of select content items. This structured arrangement may be a list of the select content items that is displayed on the shared UI. This list can help users maintain awareness of the select content items that can be included on a UI such as text, handwritten or "inked" markings, pictures, videos, icons representing files or applications, and the like. In some configurations, awareness of the select content items can be maintained by keeping the list of content items visible to all users on the shared UI. Thus, when any user moves or modifies one of the listed items, other users can refer to the list to maintain awareness of those items. In other configurations, permissions can control modification of the list by restricting editing rights to only certain users such as a moderator. This prevents users other than the moderator from adding, removing, or rearranging the content items in the list. Thus, the list can help particular users, such as the moderator, to keep track of content items.

The moderator, and other users, can easily find content items on the list because those content items will be visible on the shared UI and the structure of the list is protected through restriction of editing rights. For example, if a user writes a question on the shared UI and the moderator is not able to immediately address that question, the moderator may move it to the list to ensure that the question remains visible and that it is not deleted or modified by anyone else.

Inclusion of content items in the list can help prompt a moderator and/or another user to return to those content items later in a communication session. The list functions as a separate place or a unified place where some of the content items generated during the communication session are collected and stored. Without a structure or system to remind users, some content items may be missed or set aside and forgotten. For example, a user may place a diagram on a shared UI but the other users in the communication session may not notice the diagram. The moderator, or another user such as the user who shared the diagram, may add the diagram to the list. Users then remain aware of the diagram because it is in the list. Additionally, an agenda may be modified to add time for discussing content items in the list such as the diagram.

These technologies can encourage participation because users whose content items are not discussed immediately can see that their content items are included in the list. These technologies can also promote equity and fairness during communication sessions because content items from any user, not just the most vocal users or users in the same room as the moderator, may be included in the list and drawn to the attention of the group.

The list of content items may be displayed in a list region on the shared UI. This list region may, for example, be located along one of the edges of the shared UI. The list region can function like a "parking lot" in which content items are placed temporarily. Content items may be removed from the list or deemphasized once they are discussed. In some configurations, the size of the list region may be adjusted so that it fits within a dimension (e.g., height, width, or both) of a display device that presents the shared UI. This allows the users to view all the content items in the list even if other portions of the shared UI are offscreen. The list region may also be present on the UIs of some but not all users. For example, users joining a communication session remotely may not see the list or the list may be visible only on the computing device of the moderator.

There are many possible ways to add content items to the list. Content items may be dragged from a main region of the shared UI to the list region. A content item may also be tagged or marked for inclusion in the list by placing a pin in the content item, checking a box next to the content item, choosing from a drop-down menu, or the like. In various configurations, different users or sets of users can add content items to the list. For example, those who can edit the list may be limited to only the moderator, only the moderator and a user who provided a content item, or, in other configurations, a larger set of users may be able to edit the list.

Content items in the list may be ordered relative to each other. The ordering may be performed programmatically by a computing system according to a characteristic of the content items. In some configurations, a user such as the moderator may be able to manually rearrange the content items in the list. The characteristic by which the content items are ordered may be specified or a default characteristic may be used. For example, the content items may be ordered by priority level (e.g., high, medium, or low), type of content item (e.g., text, image, file, etc.), time (e.g., time of creation, time of addition to the list, etc.), the identity of the user who contributed the content item (e.g., ordered alphabetically by name, by seniority, etc.), or another characteristic.

Content items added to the list may be associated with countdown timers. Once a countdown timer reaches zero, the associated content item is emphasized on the shared UI. The content item may be emphasized by making it more visually prominent, moving it, or the like. This serves as a reminder for the users to revisit the content item. The period of time represented by a countdown timer may be specified when a user places the content item on the list. In some configurations, pins that are used to tag content items for inclusion in the list may be associated with specific time periods. For example, tagging a content item with a 10-minute pin may both place the content item in the list and start a 10-minute countdown timer.

The content items in the list may also be labeled with the identity of the user who contributed the content item. Displaying an association between a content item and a user on the UI can assist the moderator in recognizing which user provided the content item. The moderator is thus able to provide the credit for the content item to the correct user. The moderator can also send thank you notes after the communication session or contact users about content items that were not addressed during the communication session.

Content items in the list represent topics that are of interest to the moderator or other user but have not yet been discussed. To ensure that those content items are discussed, the list may be used to modify an agenda for the communication session. For example, content items in the list may be inserted into the agenda while the communication session is in progress. Content items may be inserted into the agenda with other agenda items related to the same topic or same type of content. The agenda may be modified to make time at the end of the communication session for the content items in the list.

It should be appreciated that the above-described subject matter may be implemented as a computer-controlled apparatus, a computer process, a computing system, or as an article of manufacture such as a computer-readable medium. Among many other benefits, the techniques disclosed herein improve efficiencies with respect to a wide range of computing resources. For instance, processor cycles, memory, and network bandwidth may be saved because users can readily view and interact with content items in the list without the need to access search functionality, send queries to other users, or manually search across the entire shared UI. Other technical effects besides than those mentioned herein can also be realized from implementations of the techniques disclosed herein.

This Summary is provided to introduce a selection of concepts in a simplified form that are further described below in the Detailed Description. This Summary is not intended to identify key or essential features of the claimed subject matter, nor is it intended to be used as an aid in determining the scope of the claimed subject matter. The term "techniques," for instance, may refer to system(s), method(s), computer-readable instructions, module(s), algorithms, hardware logic, and/or operation(s) as permitted by the context described above and throughout the document.

BRIEF DESCRIPTION OF THE DRAWINGS

The Detailed Description is described with reference to the accompanying figures. In the figures, the left-most digit(s) of a reference number identifies the figure in which the reference number first appears. The same reference numbers in different figures indicate similar or identical items. References made to individual items of a plurality of items can use a reference number with a letter of a sequence of letters to refer to each individual item. Generic references to the items may use the specific reference number without the sequence of letters.

DETAILED DESCRIPTION

Figure 1:
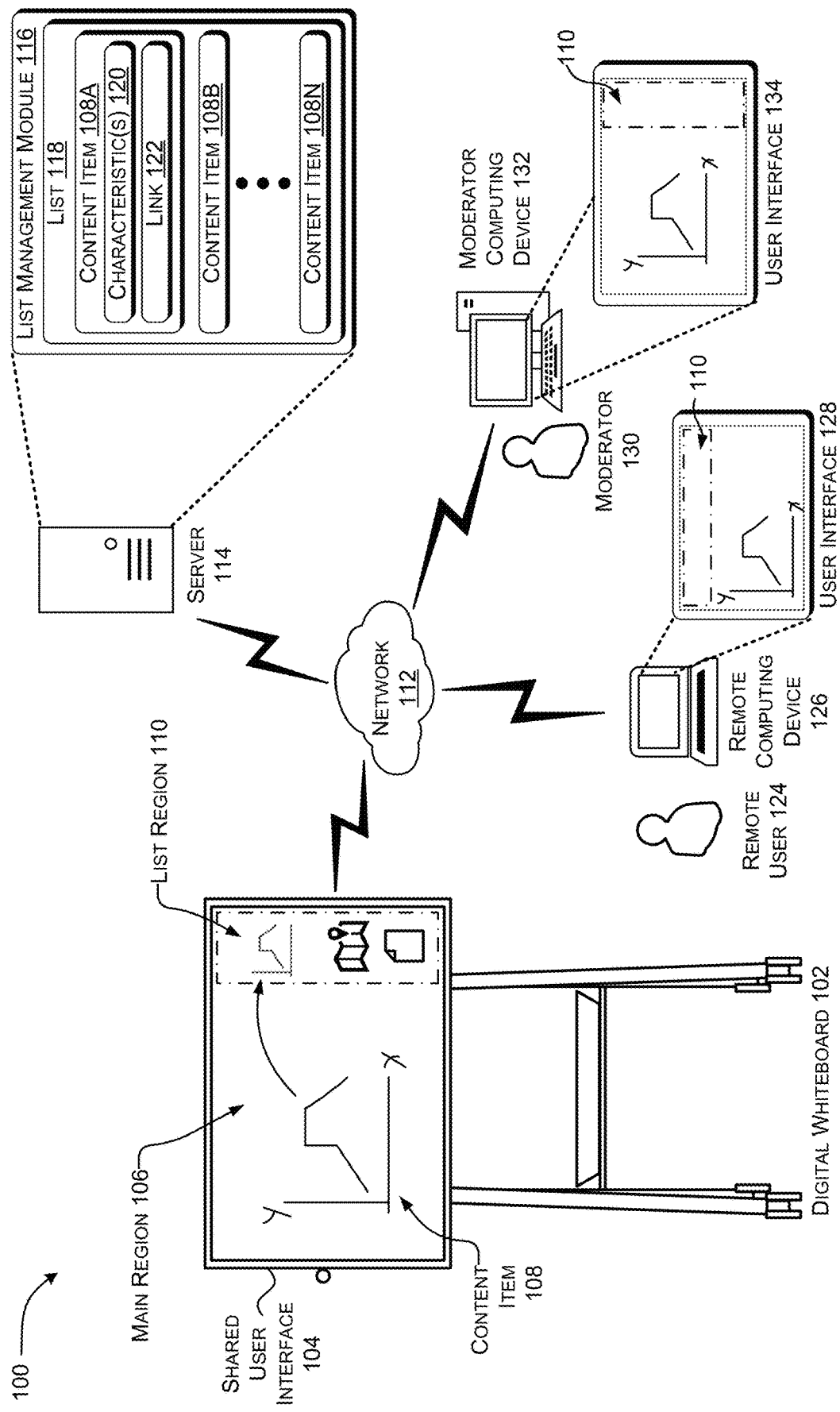
FIG. 1 illustrates an architecture for arranging content items in a list region of a shared UI.

This disclosure provides techniques for tracking, storing, and organizing comments, questions, contributions, and ideas generated in a communication session. As used herein, a communication session may include a video conference, a network conference, a telephonic conference, a collaborative real-time workspace, a webcast, a web meeting, a group chat, and the like. These techniques create a specific location on a UI to place content items contributed by users participating in the communication session.

The UI is a shared UI that is both viewed and manipulated by multiple users. Shared UIs include digital whiteboards that provide a large touchscreen for use by multiple users. Another type of shared UI is a "shared canvas" that is shared across multiple different computing devices during a communication session. Changes made to the shared canvas on one computing device are shown on the other computing devices. A shared UI may also combine a single device shared by multiple users such as a digital whiteboard with shared canvases on other computing devices. Other implementations of shared UIs are also included within the scope of this disclosure.

The questions, contributions, ideas, and such generated by users in a communication session are represented by content items placed onto the shared UI. The content items may be any type of file, marking, or other content that is capable of being represented on the shared UI. For example, content items may be handwritten or "inked" writing on a touchscreen, text, drawings, icons representing files, pictures, videos, webpages, etc. The content items are added to the shared UI by one of the users in the communication session. This user is referred to as the contributor of the content item. He or she may have created the content item or obtained the content item from another source and placed it into the shared UI.

The collaborative nature of a shared UI can also be a challenge with respect to organizing content items on the shared UI. Particularly during a fast-based meeting, there may be many content items contributed by multiple users in a way that is cluttered or unstructured. Providing structure to the shared UI by creating a region for holding specific content items can increase the effective use of computing resources by reducing the need for a moderator or other user to later search all of the shared UI for these specific content items.

There are many reasons that users participating in a communication session may wish to track certain content items. For example, a moderator may flag content items that he or she wishes to discuss later. Providing a dedicated region of the shared UI to store these content items helps to keep the moderator organized and can show other users that these content items are not forgotten. A user that contributed a content item which he or she feels has not been sufficiently addressed (e.g., a spreadsheet file with a proposed budget) may wish to flag that content item on the shared UI rather than speaking up during a meeting. This can promote equality and fairness during a communication session.

FIG. 1 is an architecture 100 that may include a digital whiteboard 102. The digital whiteboard 102 may be implemented as a computing device with a large touch screen that can be used by multiple people simultaneously. A user interface presented on the screen of the digital whiteboard 102 is one example of a shared UI 104. The shared UI 104 may be divided into two or more regions. A first region is referred to as the main region 106. The main region 106 of the shared UI 104 can present one or more content items 108 such as, but not limited to, handwritten text or hand-drawn images.

The main region 106 will typically behave according to default settings of the shared UI 104. The default settings may be provided by the digital whiteboard 102, software running on the digital whiteboard 102, or another source. The main region 106 is used collaboratively. Multiple users can add content items 108 to the main region 106. All users may be able to edit and delete content items 108 from the main region 106. In some configurations, users may even have permissions to edit or delete content items 108 provided by another user.

A second region is referred to as a list region 110. Interaction with the list region 110 is more structured and controlled than interaction with the main region 106. The list region 110 contains content items 108 that are explicitly added to the list region 110. In some configurations, the list region 110 may contain any number of content items 108 including zero (e.g., when it is empty). There may be an upper limit on a number of content items 108 that can be included in the list regions 110 such as three, five, 10, 15, or more content items 108. The upper limit may be selected by a user or imposed by a computer system. Although shown as a rectangle, the list region 110 may be any shape. The list region 110 may occupy any amount of the total display area such as, for example, 5%, 10%, 15%, 20%, 25%, or more.

The digital whiteboard 102 may have a network connection to a network 112. The network 112 may be implemented as any one or more types of communications networks such as the Internet, a Local Area Network (LAN), a Wide Area Network (WAN), a mesh network, a peer-to-peer network, etc. The network 112 may use both wired and wireless protocols for carrying data.

In some configurations, the network 112 may connect the digital whiteboard 102 to a server 114. The server 114 may be a single computing device or multiple computing devices such as a rack of servers. In this disclosure, the server 114 may also represent a "cloud" resource that includes multiple discrete processing, storage, and networking resources which may be distributed across multiple physically separate locations.

The server 114 may provide resources to implement, manage, and maintain the list region 110. For example, the server 114 may include a list management module 116. The list management module 116 may contain a list 118. The list 118 is a data structure that may include one or more content items 108A, 108B, . . . , and 108N. The list region 110 is a visual (e.g., textual or graphical) representation on the content item(s) 108 in the list 118. In some configurations, the list region 110 is not shown on the shared UI 104 such as, for example, during display of a full-screen video.

Each of the content items 108A-108N included in the list 118 may have one or more characteristics 120 (e.g., attribute, quality, property, or the like). The characteristics 120 may be stored as metadata that is associated with a content item 108. Example characteristics 120 include, but are not limited to, an identity of a user that contributed the content item 108, a timestamp, a priority label, or a type label.

The content item 108 may itself be moved or copied into the data structure of the list 118. However, in some configurations, the list 118 may include a link 122 to a content item 108A rather than the data representing the content item 108A. The link 122 may be a reference, pointer, address, hyperlink that corresponds to the content item 108A.

In some configurations, the list management module 116 may be included in the digital whiteboard 102 and the architecture 100 may not include the server 114. Thus, the digital whiteboard 102 may implement features of this disclosure as a stand-alone device with or without a network connection.

The communication session may include one or more remote users 124 that join the communication session from a remote computing device 126 via the network 112. The remote users 124 are physically separate from the location of the digital whiteboard 102. In some configurations, the communication session may comprise only remote users 124 in the sense that each user is physically separate from each other and no users are co-located. In this scenario, the digital whiteboard 102 may be omitted from the architecture 100 or replaced with one or more additional remote users 124 and remote computing devices 126.

The remote computing device 126 includes a UI 128. A display device presenting the UI 128 may be visible to only the remote user 124. Thus, while the display device is not shared with other users, the UI 128 may be a shared UI in that it includes a shared canvas. A shared canvas displays the same content items 108 and other UI elements as the digital whiteboard 102 or any other computing device joined in the communication session. The UI 128 may also include the list region 110. The list region 110 may be displayed differently on the UI 128 than on the digital whiteboard 102 (e.g., orientation changed from vertical to horizontal, shape changed, size changed, etc.). However, the list region 110 displays the same content items 108 on all devices.

The communication session may include a moderator 130. "Moderator" as used in this disclosure includes roles and types of users such as host, meeting organizer, meeting owner, device owner, or the like. Stated differently, the moderator 130 is a participant in the communication session who has a greater level of direct or indirect control over the behavior of software and/or hardware implementing the communication session than other participants. One type of control the moderator 130 may have that other users lack is control over the list region 110. The moderator 130 may have permissions associated with his or her account that permit editing of the list region 110 and content items 108 in the list 118. Some or all other users may be restricted by these permissions from editing the list region 110 and the list 118.

The moderator 130 may participate in the communication session through a moderator computing device 132 that communicates with the server 114, the digital whiteboard 102, and/or remote computing devices 126 via the network 112. However, in some configurations, the moderator 130 may interact directly with the digital whiteboard 102. Because the digital whiteboard 102 is used collaboratively by multiple users, permissions specific to the moderator 130 may be implemented by distinguishing input from the moderator 130 from input of other users. For example, the digital whiteboard 102 may use a biometric technique such as face recognition, fingerprint recognition, handwriting recognition, or voice recognition to identify the moderator 130. The digital whiteboard 102 may additionally or alternatively use specific hardware to recognize the moderator 130 such as a stylus, smartwatch, ring, identification badge, or the like that is associated with the moderator 130.

In configurations in which the moderator 130 uses a separate moderator computing device 132, that computing device includes a UI 134. The UI 134, like the UI 128, may function as a shared UI by displaying a shared canvas (i.e., the same shared canvas as UI 128). The UI 134 may include the list region 110. In some configurations, the list region 110 may be displayed only on the moderator computing device 132. Thus, other computing devices such as the remote computing device 126 and the digital whiteboard 102 may display the main region 106 of the shared UI 104 without the list region 110.

Figure 2:
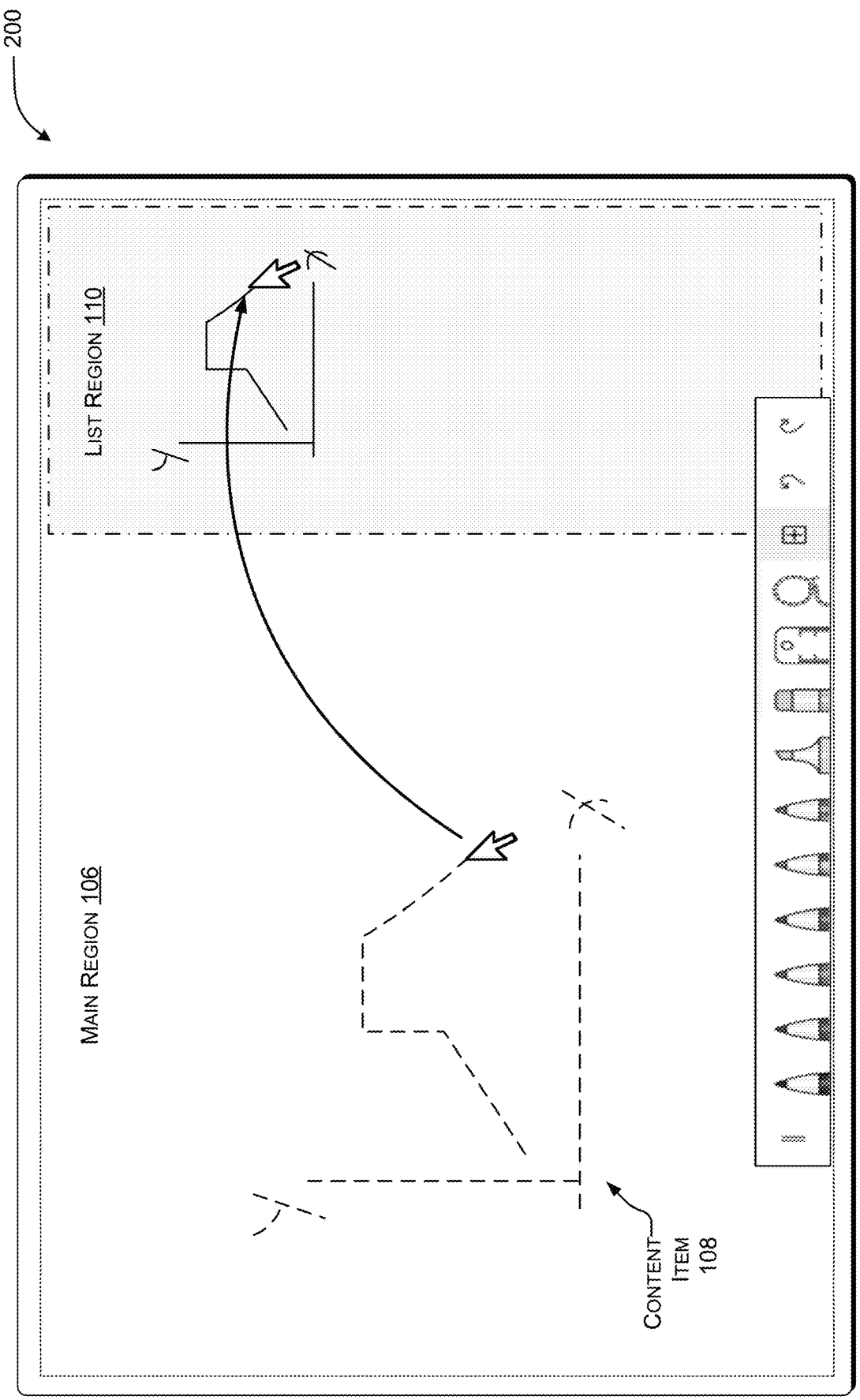
FIG. 2 is an illustrative UI view showing a content item being dragged from a main region to a list region of the UI.

FIG. 2 shows an illustrative UI view 200 of a content item 108 being moved from the main region 106 to the list region 110 of a shared UI such as the shared UI 104 on the digital whiteboard 102. In this UI view 200, the content item 108 is added to the list region 110 by a drag operation implemented by, for example, moving a cursor. The dashed lines showing the content item 108 at its starting position indicate that the content item 108 is removed from the main region 106 when it is added to the list region 110.

The displayed size of the content item 108 may change when added to the list region 110. The displayed size of content item 108 may be reduced (or increased) in the list region 110 as compared to the displayed size in the main region 106. In some configurations, particularly if there is limited space in the list region 110, the content item 108 may be represented by a simplified visual image, a name of the content item 108, or a textual description of the content item.

Figure 3:
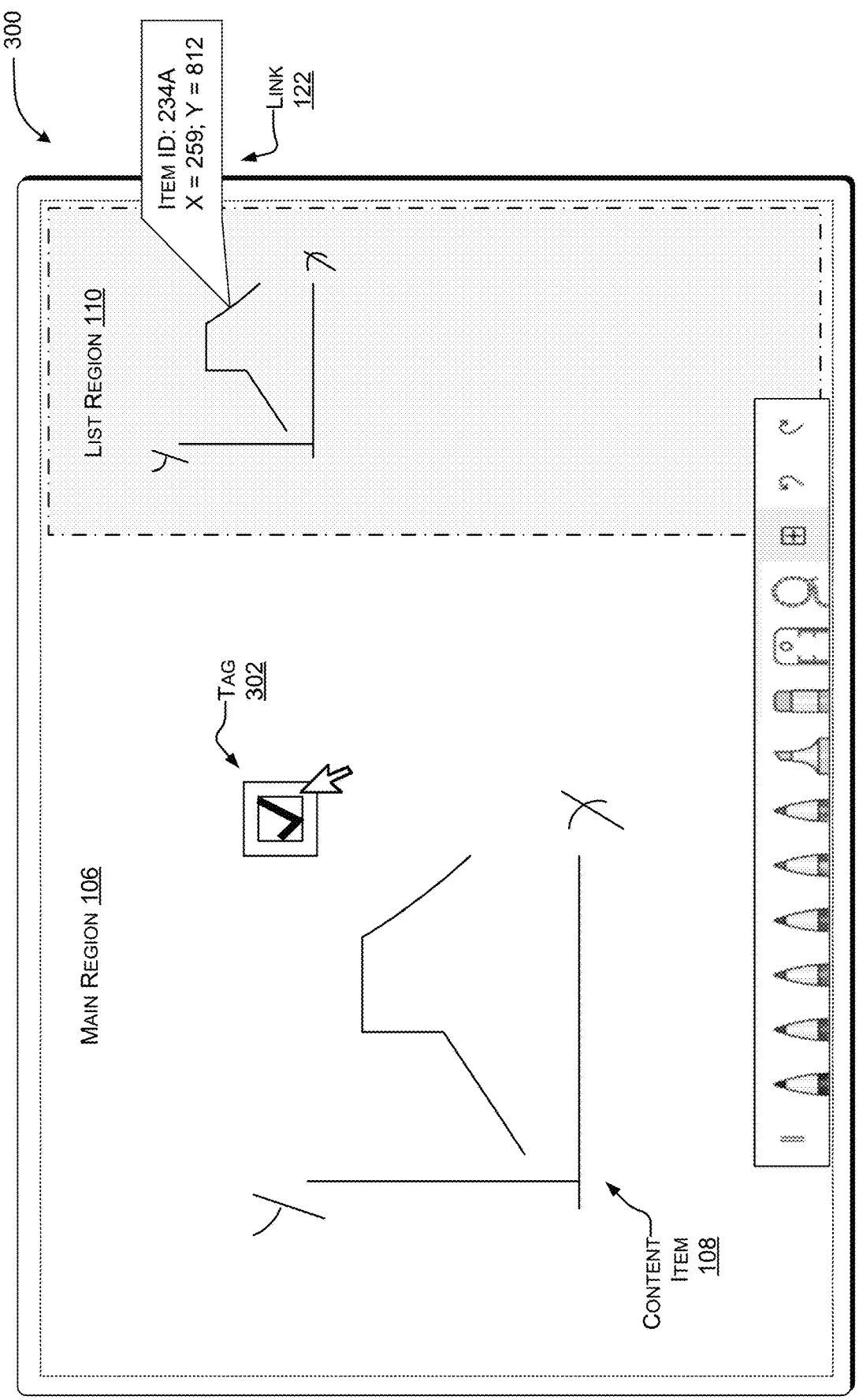
FIG. 3 is an illustrative UI showing tagging of a content item as a mechanism for adding a link to the content item in a list region of the UI.

FIG. 3 shows an illustrative UI view 300 of a content item 108 being added to the list region 110 of a shared UI such as the shared UI 104 on the digital whiteboard 102. In this UI view 300, selection or activation of a tag 302 adds the content item 108 to the list region 110. This may be referred to as "tagging" the content item 108. The tag 302 is shown as a checkbox in this example but it may be implemented using any number of different types of UI elements such as a radio button, a pop-up dialog box, a drop-down menu, and the like. This UI view 300 provides an example of the content item 108 being copied to the list region 110 without removing the content item 108 from the main region 106.

The content item 108 in this example is included in the list region 110 by a link 122. The link 122 includes information sufficient to uniquely identify the content item 108. For example, the link 122 may include an item identifier and the location of the content item 108 on the shared UI 104. Generally, the details of the link 122 are not displayed in the list region 110. The details of the link 122 may be stored in the list 118 and a visual representation of the content item 108 is shown in the list region 110. The link 122 may propagate any changes made to the content item 108 in the main region 106 to the list region 110. Thus, if the content item 108 is modified in the main region 106, the visual representation of the content item 108 in the list region 110 is also modified.

Figure 4:
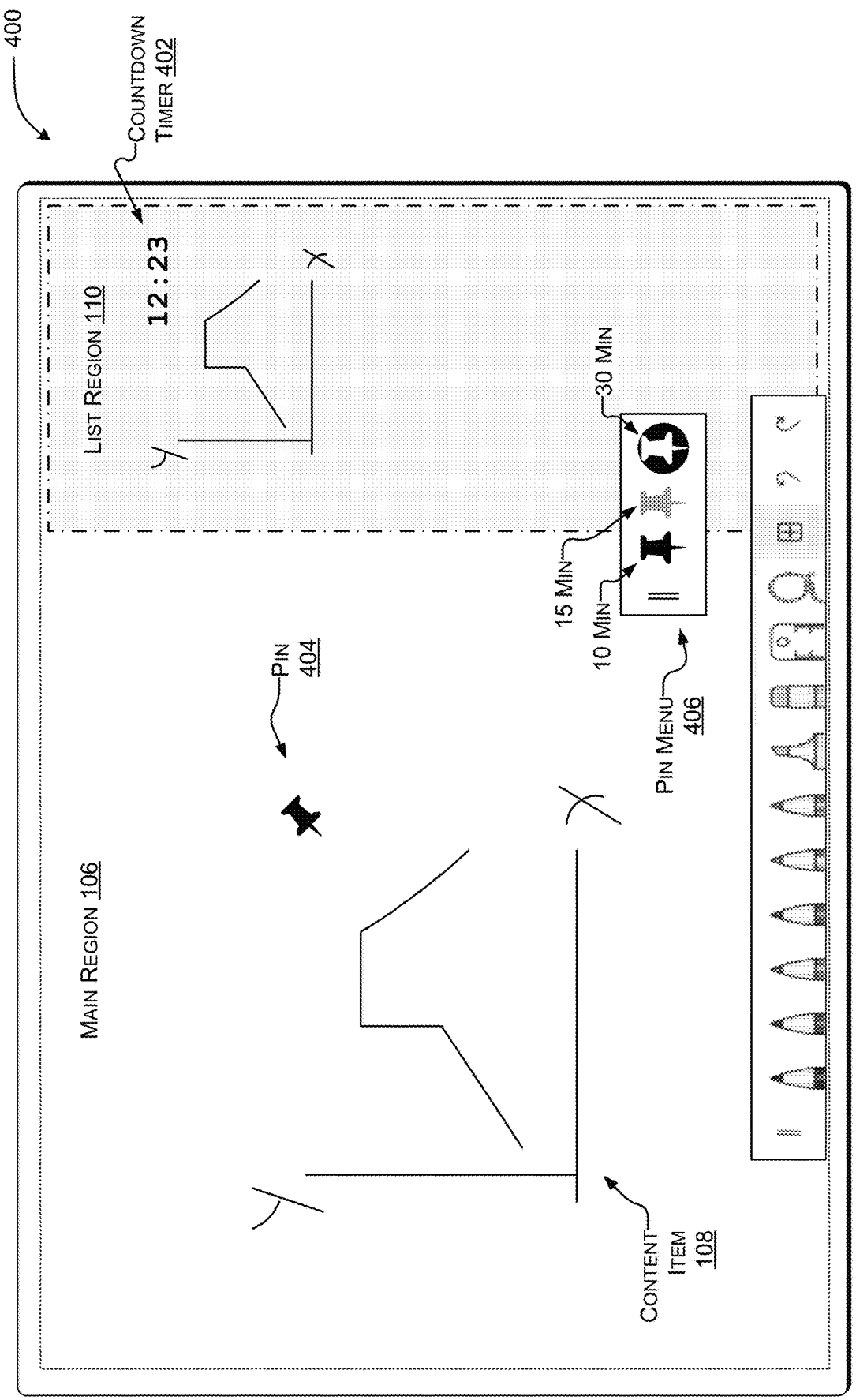
FIG. 4 is an illustrative UI showing the use of a pin associated with a time period to place a content item in a list region of a shared UI and associating the content item with a countdown timer.

FIG. 4 shows an illustrative UI view 400 of a content item 108 being added to a list region 110 in association with a countdown timer 402. UI view 400 shows a shared UI such as the shared UI 104 on the digital whiteboard 102. This UI view 400 presents another way of adding a content item 108 to the list region 110 by placing a pin 404 ("pinning") in or near the content item 108. As used herein, pinning is a type of tagging. The pin 404 may be available, for example, from a pin menu 406 that may be part of the shared UI 104. But, in other configurations, the pin menu 406 may be available only on a UI accessible to the moderator 130 such as the UI 134.

Pinning may place a version of the content item 108 into the list region 110 that shows the content items as it was at the time it was pinned. Thus, if the content item 108 is later changed in the main region 106, the version of the content item in the list region 110 remains unchanged. The same content item 108 may be pinned multiple times to place multiple versions into the list region 110 showing how the content item 108 was changed during a communication session.

In some configurations, the pin menu 406 may present multiple pins associated with different periods of time (e.g., 10 minutes, 15 minutes, 30 minutes, etc.). Pins in the pin menu 406 may have different colors, textures, shapes, or other visual variation to represent the different periods of time. The period of time is a duration of a countdown timer 402. The countdown timer 402 serves as a reminder to the moderator 130 and/or other users to revisit the content item 108 after the time elapses. In some configurations the countdown timer 402 is displayed in the list region 110. In other configurations, time remaining on the countdown timer 402 is tracked by a computing system but not displayed.

Associating a countdown timer 402 with a content item 108 may cause the content item 108 to be hidden on one or both of the main region 106 and the list region 110 until the countdown timer 402 reaches zero. This reduces visual clutter on the shared UI 104 thereby promoting efficient use of the computing device and improving the efficiency of the communication session. Hiding a content item 108 for a period of time may be thought of as putting the content item 108 into a "snooze" status. A content item 108 in snooze status it is still included in the list 118 even though the content item 108 may not be visible in the list region 110.

Providing pins 404, or another selection technique, associated with specific time periods allows for a single UI interaction (e.g., tagging or pinning) to both add the content item 108 to the list region 110 and associated the content item 108 with the countdown timer 402. This improves human-computer interactions by making it quicker and simpler for a user to add the content item 108 to the list 118 and start a countdown timer 402. This can also prevent input errors such as associating a countdown timer 402 with the wrong content item 108.

Figure 5A:
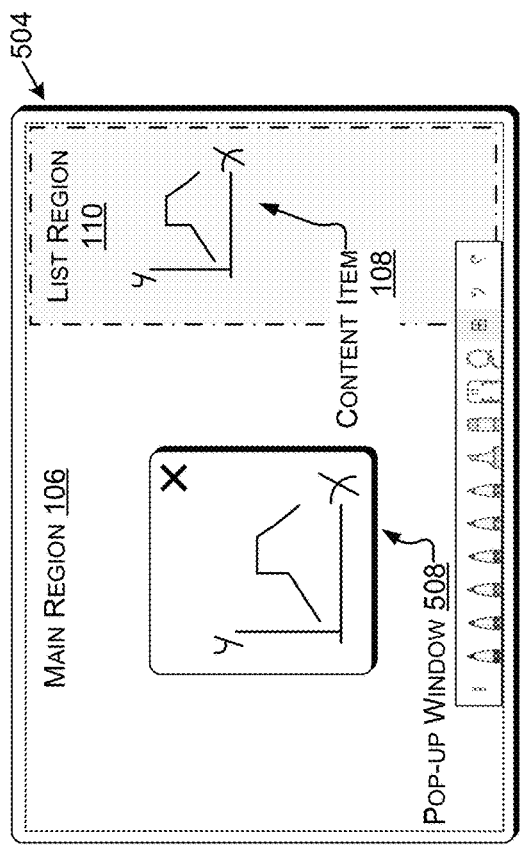
FIGS. 5A-D are illustrative UIs showing examples of changes in the prominence of a content item in a list region of a shared UI once a countdown timer has elapsed.
Figure 5C:
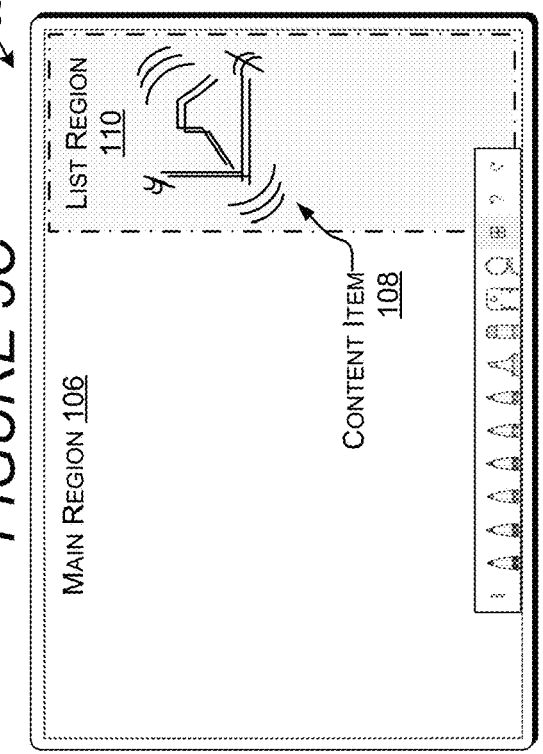
Figure 5B:
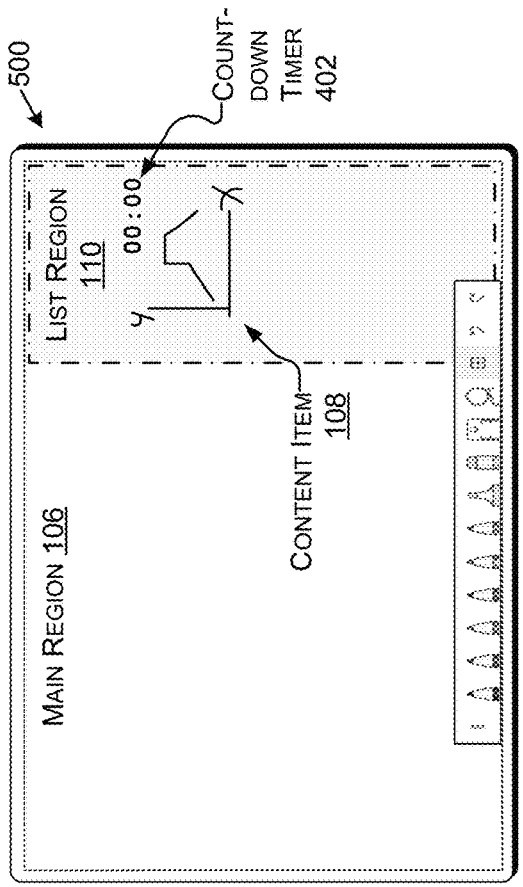
Figure 5D:
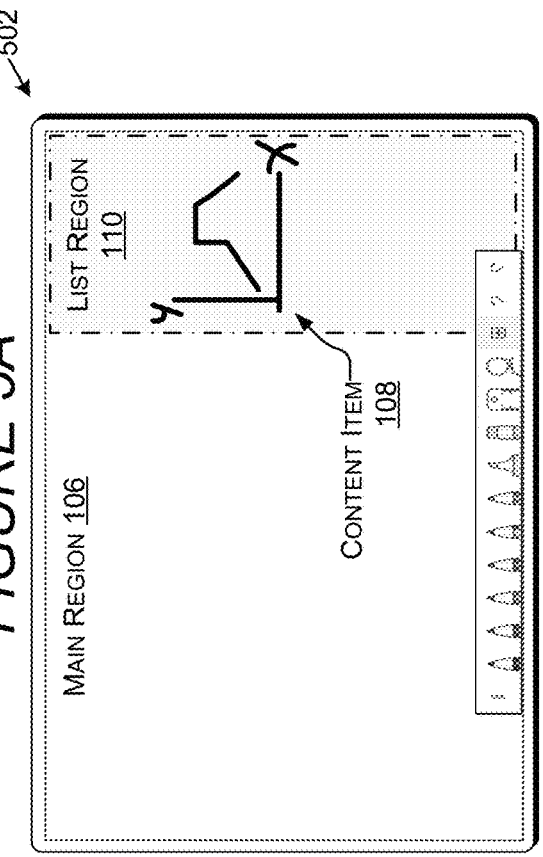

FIGS. 5A-D show illustrative UI views 500, 502, 504, and 506 showing examples of a change in the visual appearance of the content item 108 once the countdown timer 402 has elapsed. There are many ways that the visual appearance of a content item 108 may be changed and the following examples are illustrative rather than limiting. FIG. 5A shows UI view 500 that displays the countdown timer 402 in the list region 110. In this UI view 500 the countdown timer 402 has reached zero. The countdown timer 402 itself showing zero time remaining is the change in the visual appearance of the content item 108. FIG. 5B shows UI view 502 in which the visual appearance of the content item 108 is changed by bolding or increasing the thickness of lines in the content item 108. FIG. 5C shows UI view 504 in which the visual appearance of the content item 108 is changed by displaying the content item 108 in a pop-up window 508 in the main region 106. FIG. 5D shows UI view 506 in which the visual appearance of the content item 108 is changed causing the content item 108 to vibrate or move.

FIGS. 6A-D show examples of the list region 110 with ordering of content items 108 based on various characteristics 120. The characteristics 120 may be obtained from the list 118 and the ordering of the content items 108 may be performed by the list management module 116.

The various configurations of the list region 110 shown in FIGS. 6A-D are displayed in isolation from the context of the shared UI 104 for the sake of simplicity. It is to be understood, however, that the list regions 110 shown in FIGS. 6A-D will usually be displayed in conjunction with the main region 106 as part of a shared UI 104. Although only three content items 108 are shown in these example list regions 110, any list region 110 may include more or fewer content items 108.

Figure 6A:
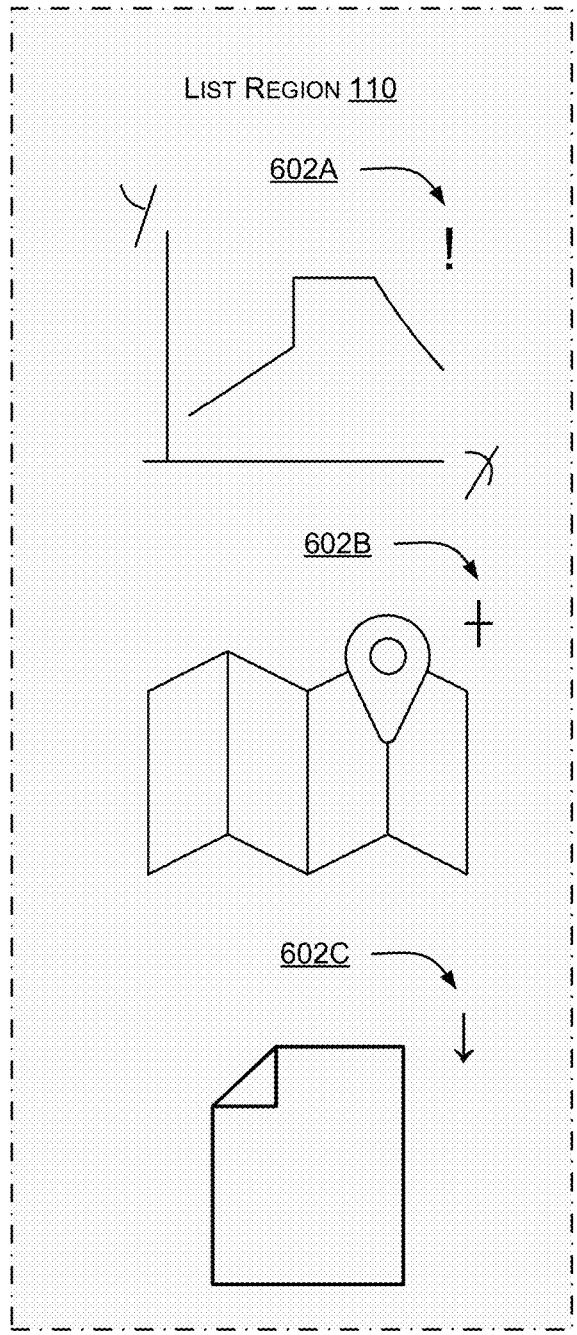
FIGS. 6A-D are illustrative UIs showing example orderings of content items in a list region of a shared UI.

FIG. 6A shows content items 108 sorted based on priority ranking 600. Priority ranking 600 is a ranking based on priority labels 602 that represent importance, urgency, priority, and the like. Priority labels 602 may be indicated with words such as high, medium, and low. Priority labels 602 may be indicated with numerical scores such as a number between 1 and 5. Priority label 602 are generally assigned to content items 108 by the moderator 130. In some configurations, even though users besides the moderator 130 have sufficient permissions to add content items 108 to the list region 110, only the moderator 130 can assign a priority label 602 to the content items 108 in the list region 110.

In this example of priority ranking 600, the content items 108 are each associated with a different symbolic representation indicating different priority labels 602A (exclamation point), 602B (long cross), and 602C (down arrow). In some configurations, the priority labels 602A, 602B, and 602C are not shown in the list region 110. The priority ranking 600 of the content items 108 may place the content item 108 associated with the highest priority label 602A at the top of the list region 110 and the content item 108 associated with the lowest priority label 602C at the bottom of the list region 110. However, other arrangements are also possible such as ordering from left to right, from bottom to top, or from right to left. The ordering used in the list region 110 may be based on a reading direction of the language indicated in a language setting for the shared UI 104.

Figure 6B:
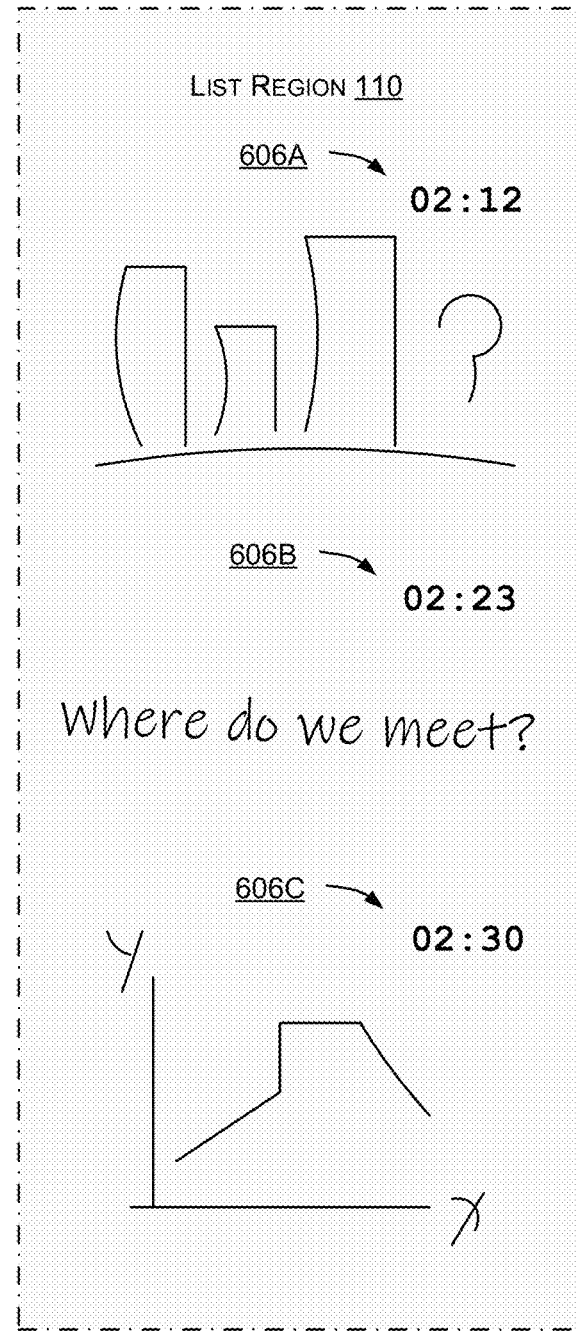

FIG. 6B shows content items 108 sorted based on time ranking 604. Time ranking 604 includes sorting based on timestamps 606A, 606B, and 606C associated with the content items 108. The timestamps 606 may indicate when each content item 108 was first added to the shared UI 104, when each content item 108 was added to the list region 110, or the time remaining on countdown timers 402 for each content item 108. In this example of time ranking 604, the timestamp 606A associated with the earliest time added and the associated content item 108 are displayed at the top of the list region 110. However, as described above, other arrangements based on time ranking 604 are also possible. Also, in some configurations, the timestamps 606A, 606B, and 606C are not displayed in the list region 110.

Figure 6C:
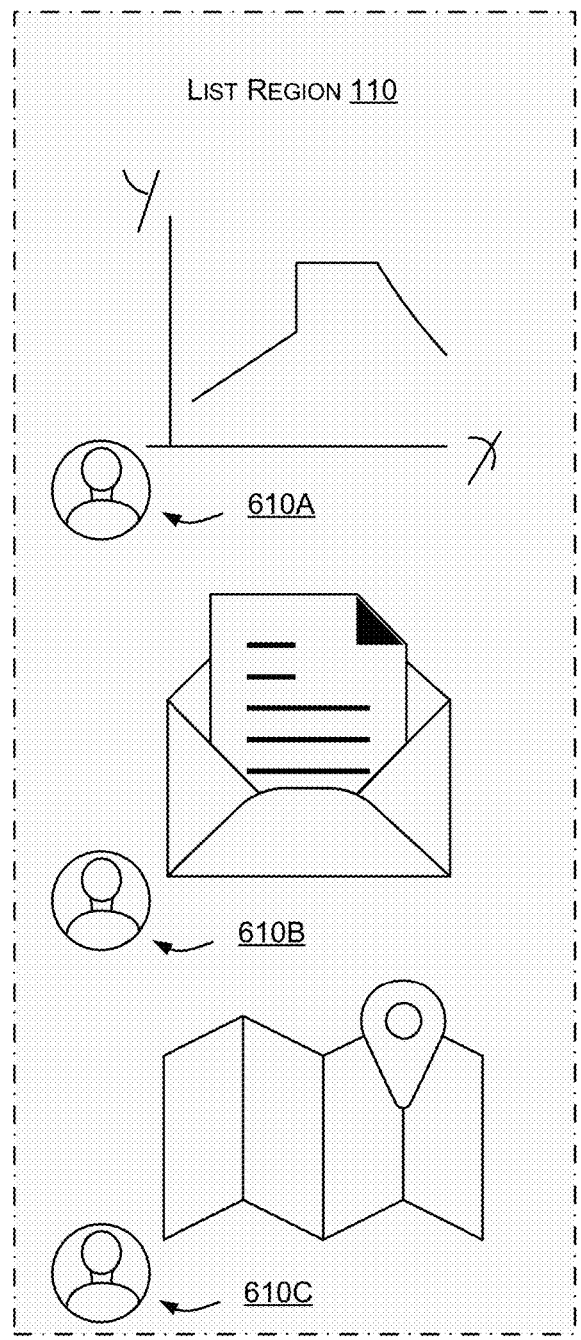

FIG. 6C shows content items 108 sorted based on user ranking 608. User ranking 608 orders the content items 108 in the list region 110 according to the identity of the user who contributed the content item 108 to the shared UI 104. The ordering may be alphabetical based on names or usernames. The ordering may be based on seniority provided by an organization chart or similar set of data accessible to the list management module 116.

The ordering may be based on location so that content items from users at the same physical location are presented beside each other in the list region 110. In some configurations, content items 108 contributed by users at remote locations, such as the remote user 124, may be included at a more prominent area of the list region 110 such as the top of the list region 110. This serves to draw increased attention to content items 108 provided by remote users who may have difficulty catching the attention of co-located participants.

Each content item 108 in the list region 110 may be associated with a respective indication of the identity of the user 610A, 610B, and 610C who contributed the content item 108. The identities of the users 610 may be indicated by one or more of text such as a name or username, a photograph of the user such as a headshot, an avatar of the user, and the like. Identifying the users who contributed content items 108 that are included in the list region 110 provides recognition to these users and allows them to receive appropriate credit for their contributions. The indications of the identities of the users 610A, 610B, and 610C may be shown even if list region 110 is not sorted or sorted based on a characteristic 120 other than user ranking 608.

Figure 6D:
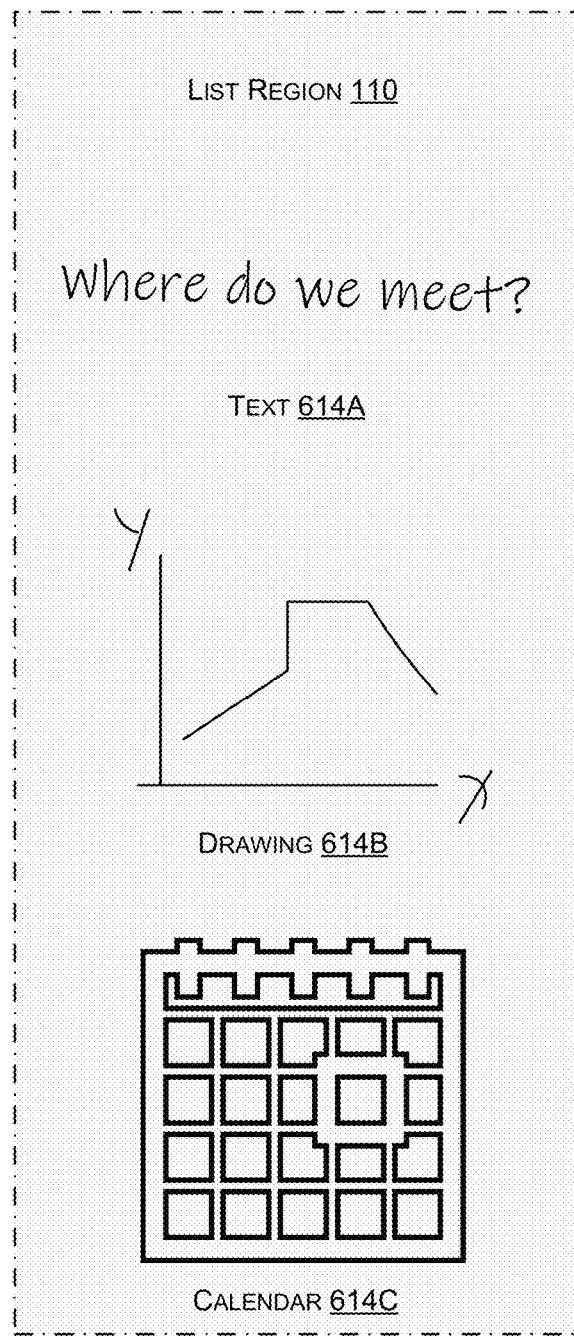

FIG. 6D shows content items 108 sorted based on a content type 612. Each content item 108 may be associated with a type label 614. A type label 614 indicates the content type 612 of a content item 108. Content types 612 include, but are not limited to, text, drawing, picture, video, file, calendar item, and webpage. In this example representation of the list region 110, the type labels 614 associated with the content items 108 are text 614A, drawing 614B, and calendar item 614C. Sorting based on a type label 614 places content items 108 of the same content type 612 adjacent to each other in the list region 110.

The ordering of content items 108 in the list regions 110 of FIGS. 6A-D may be based on a default ordering. For example, the default ordering may be time ranking 604. Alternatively, the moderator 130 (or another user in some configurations) may specify the characteristic 120 used for ordering the content items 108. The ordering may be changed during a communication session. In some configurations, individual content items 108 may be rearranged within the list region 110 even if this violates the applied ordering schema. In other configurations, the ordering may be locked and even the moderator 130 is unable to manually rearrange individual content items 108.

Figure 7:
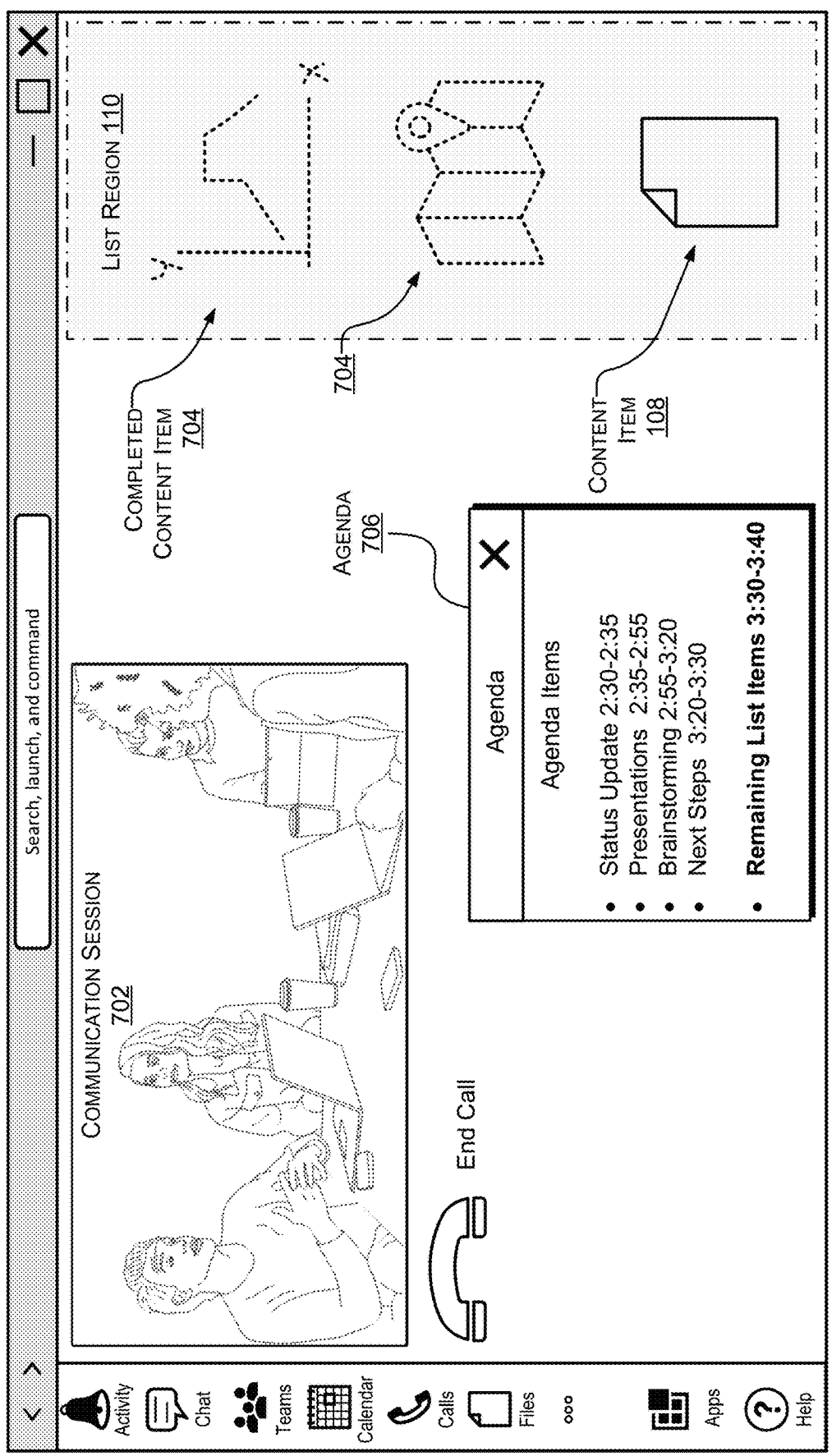
FIG. 7 is an illustrative UI showing modification of an agenda based on a content item in the list region of the UI.

FIG. 7 shows an illustrative UI 700 showing a modification of an agenda 706 based on a content item 108 in the list region 110. The UI 700 is one example of a UI displaying a shared canvas such as the UI 128 or the UI 134. This UI 700 includes a live video stream 702 of the communication session. Although not shown, any UI contained in this disclosure may include the live video stream 702.

The list region 110 shows completed content items 704 represented by dashed lines. The completed content items 704 have already been discussed or addressed during a communication session. Completed content items 704 may remain in the list region 110 with a change to their visual representation such as ghosting, graying out, changing from color to black and white, changing from solid lines to dotted lines, etc. Alternatively, completed content items 704 may be removed from the list region 110 and may also be removed from the list 118. The status of a content item 108 may be changed to that of a completed content item 704 by the moderator 130. In some configurations, only the moderator 130 has the permissions to mark a content item 108 as completed.

UI 700 also includes an agenda 706 for the communication session. The agenda 706 may include one or more agenda items that participants in the communication session intended to discuss. The agenda items may be associated with a time or time range. Inclusion in the agenda 706 represents a second tier of emphasis for a content item 108. Addition of a content item 108 to the list region 110 represents the first tier of emphasis. If use of the list region 110 does not result in a content item 108 being addressed during the communication session, the content item 108 can be added to the agenda 706 thereby providing a further opportunity to discuss the content item 108. This promotes inclusive communication sessions by providing multiple tools to ensure content items 108 are not ignored or forgotten.

A content item 108 remaining in the list region 110 may be added to the agenda 706 without direct interaction from a user (e.g. added automatically). Transfer of the content item 108 to the agenda 706 may be based on time (e.g., a predetermined clock time), completion of an agenda item (e.g. after the agenda item for presentations), the scheduled end of the communication session, or the like.

In some configurations, any content items 108 that remain in the list region 110 may be added to the end of the agenda 706. Content items 108 may be added to the agenda 706 in the same order as the order of the content items 108 in the list region 110. The moderator 130 may also, in some configurations, manually add the content item 108 anywhere in the agenda 706. For example, a content item 108 may be added to the agenda 706 as part of an agenda item that is related to the content item 108. For example, a content 108 that provides a list of goals may be added to a "Next Steps" agenda item. Adding a content item 108 to the agenda 706 may remove (temporarily or permanently) the content item 108 from the list region 110. In some configurations, if a content item 108 is not relevant to any of the current agenda items, that content item 108 may be added to an agenda for a different communication session.

Figure 8:
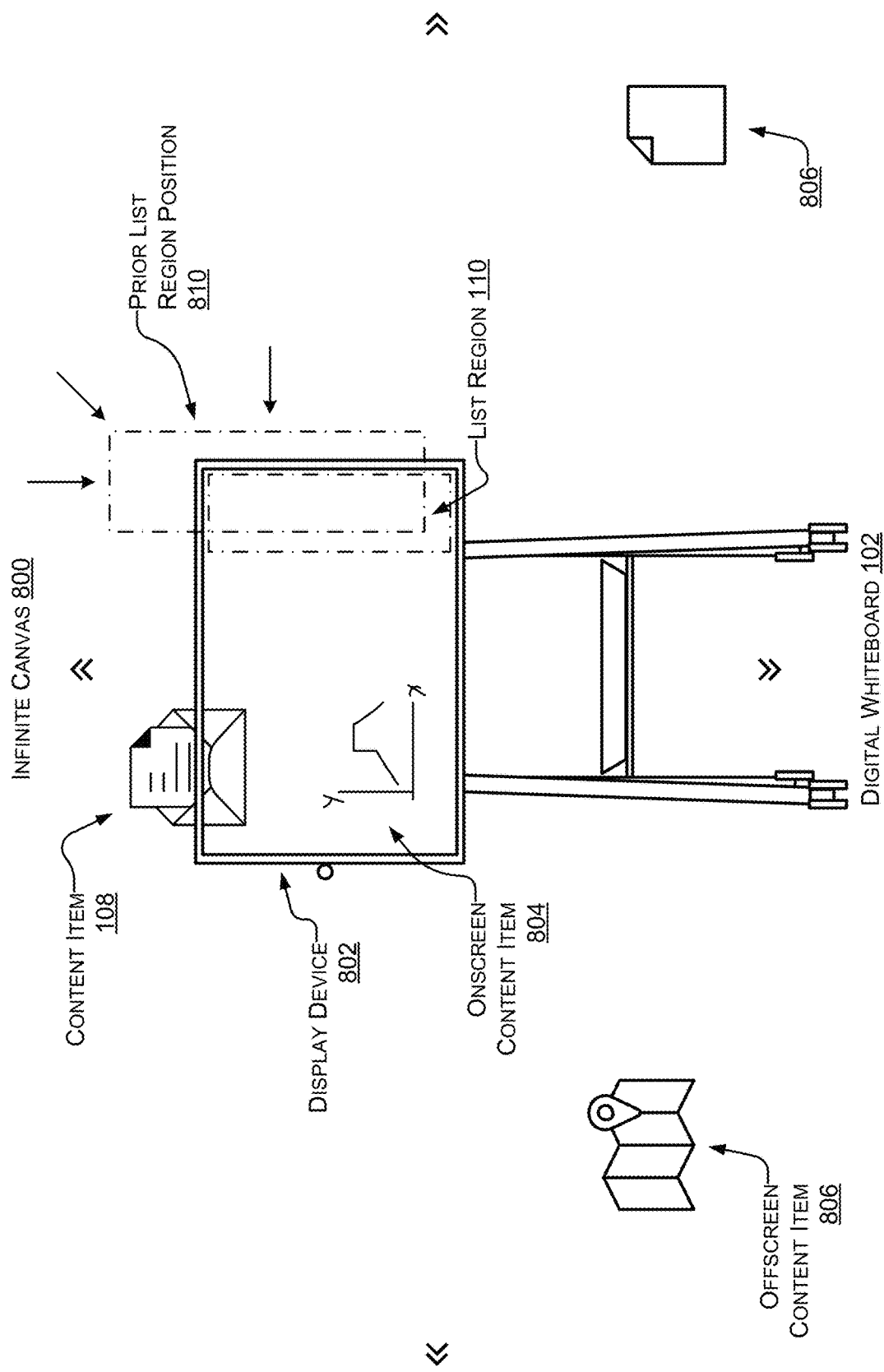
FIG. 8 shows a digital whiteboard with an infinite canvas that extends beyond the edges of a display device.

FIG. 8 shows an infinite canvas 800 that extends beyond the edges of a display device 802. As used in this disclosure, an infinite canvas 800 is a graphical space in a logical coordinate system within which relative locations of graphical elements are defined in two or more dimensions, at least one of which is conceptually infinite. A conceptually infinite dimension is a dimension that conceptually has no upper limit. An infinite canvas 800 may also provide infinite zoom in which case an infinite dimension has no lower limit.

The infinite canvas 800 may extend beyond the edges of the display device 802. The portion of the infinite canvas 800 that is rendered on the display device 802 may be changed by scrolling to a different position on the infinite canvas 800 and/or by changing a zoom level to show more or less of the infinite canvas 800. In some configurations, the digital whiteboard 102 provides an infinite canvas 800.

A content item 108 that is presented entirely within the bounds of the display device 802 is referred to as an onscreen content item 804. An offscreen content item 806 is a content item 108 on the infinite canvas 800 that is not presented on the display device 802. In some views, a content item 108 may be partially onscreen and partially offscreen.

In order to provide the benefits of an accessible and consistent reference location for selected content items 108, the list region 110 may be positioned and sized relative to one or more dimensions of the display device 802 rather than associated with a position on the infinite canvas 800. Thus, the list region 110 will always be shown on the display device 802 at a constant location and size. This may be implemented by the computer system continually updating a location and/or size of the list region 110. For example, maintaining a prior list region position 810 without change may result in the list region 110 being be offscreen or partially offscreen. Upon detecting a change to the position or scale of the infinite canvas 800, the computer system may change the position and/or size of the list region 110 relative to the infinite canvas 800.

A size of the list region 110 may also be adjusted based a dimension of a display device that does not use an infinite canvas 800. For example, various computing devices joining a communication session (e.g. the remote computing device 126 and the moderator computing device 132) may have different sized and shaped display devices. The size of the list region 110 can be adjusted or scaled based on one or more of the respective dimensions of these display devices.

Figure 9:
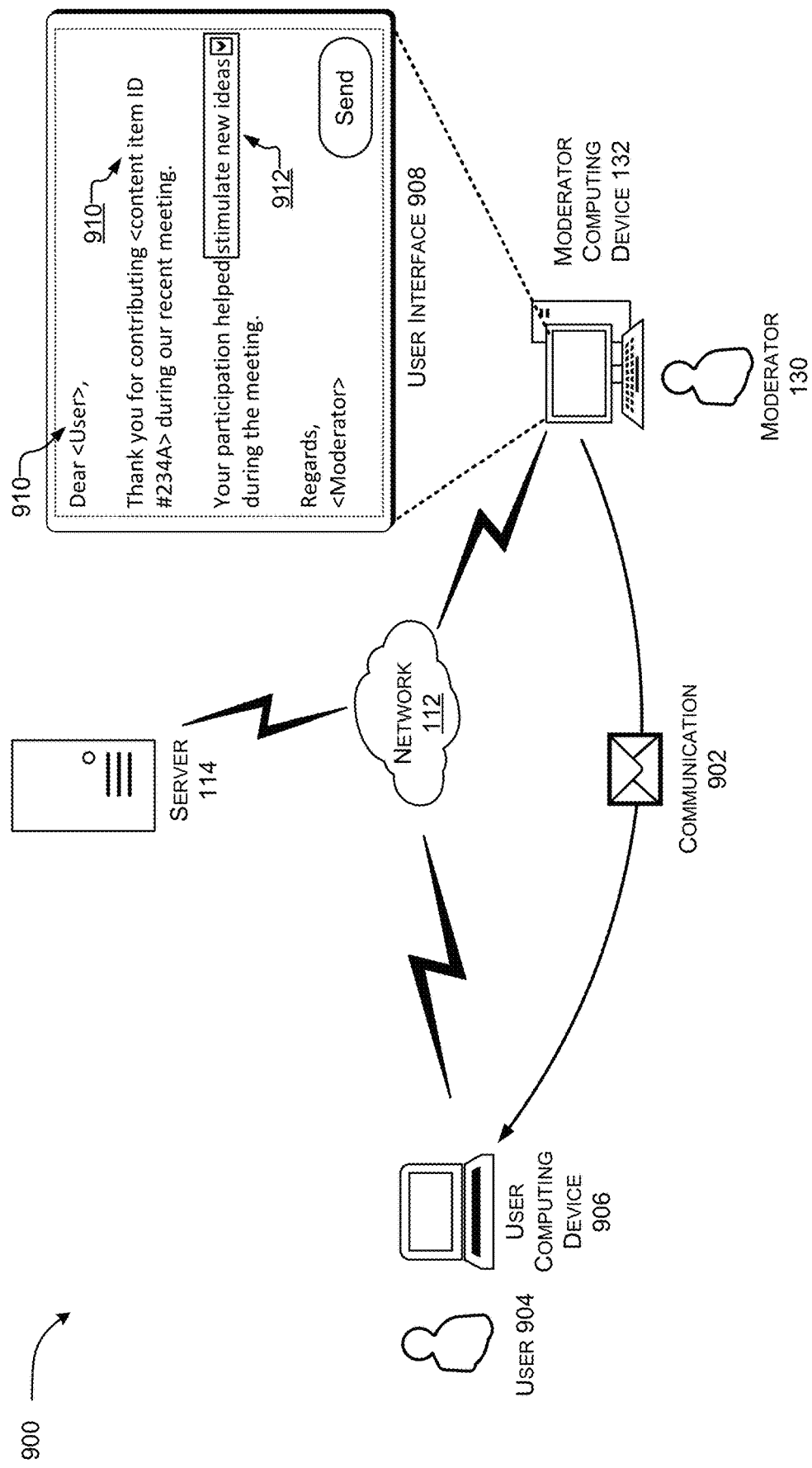
FIG. 9 illustrates an architecture for a moderator to send a communication with preconfigured content to a user who contributed a content item.

FIG. 9 shows an illustrative architecture 900 for a moderator 130 to send a communication 902 to a user 904 who contributed a content item 108. Participation and inclusion during a communication session may be promoted by recognizing those users who contribute content items 108. This recognition may be in the form of a "thank you" note or other communication 902 from the moderator 130 to the user 904. The communication 902 may be sent from the moderator computing device 132 via the network 112 to a user computing device 906 of the user 904. The communication 902 may be sent after the communication session is completed thus the user computing device 906 may be different from the computing devices that participated in the communication session.

A UI 908 of the moderator computing device 132 may present a template or form that contains pre-populated content referencing the content item 108. This makes it easy and efficient for the moderator 130 to generate a thank you note or similar communication 902. This also prevents data entry errors on the part of the moderator 130. This UI 908 may include fields 910 that obtain data from the server 114 related to the content item 108 such as the name of the user 904 and a name or identifier of the content item 108. This UI 908 may also include selectable elements 912 that the moderator 130 may interact with to customize the content of the communication 902.

Figure 10:
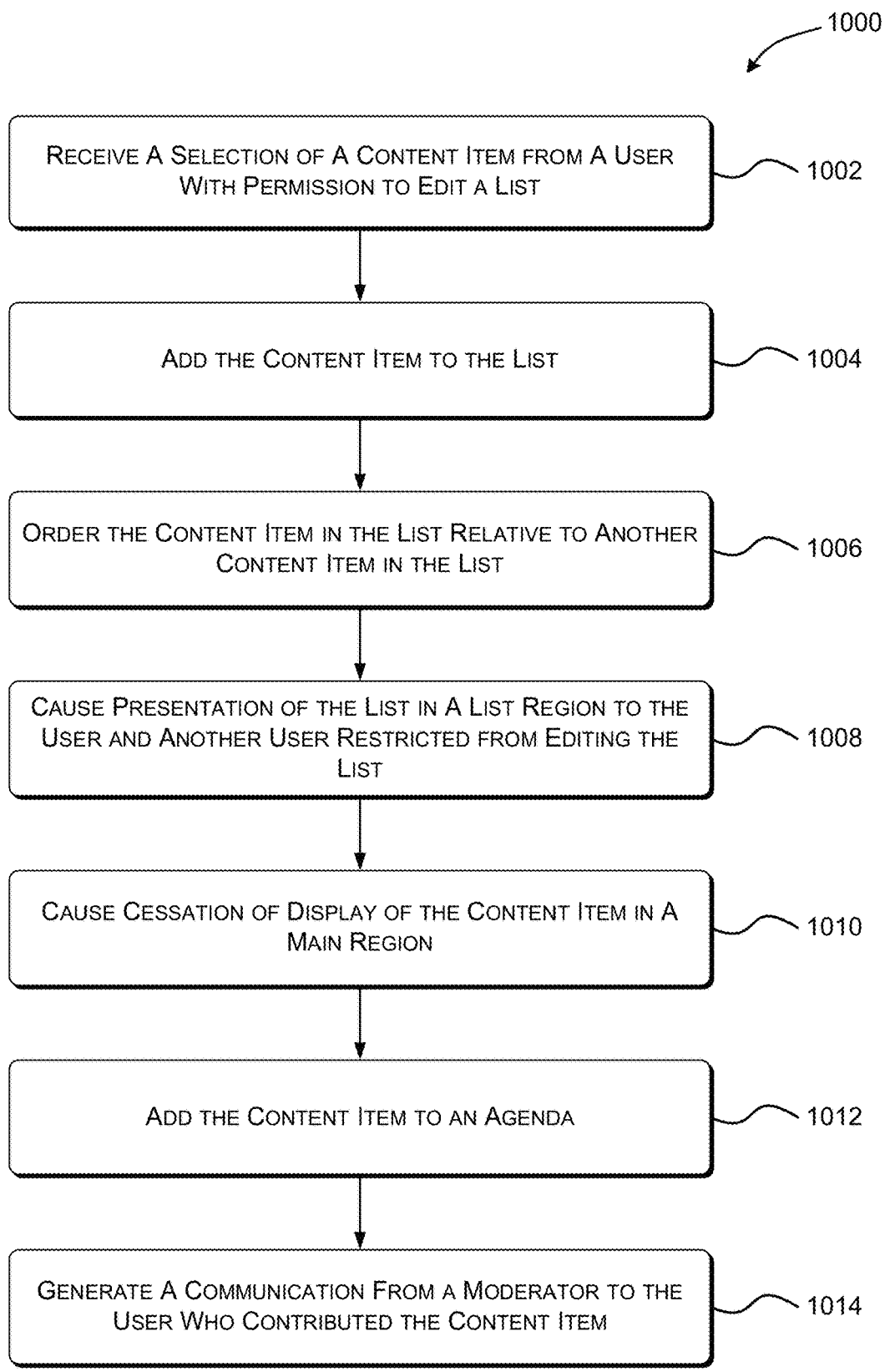
FIG. 10 is a flow diagram showing aspects of a process for adding a content item to a list.
Figure 11:
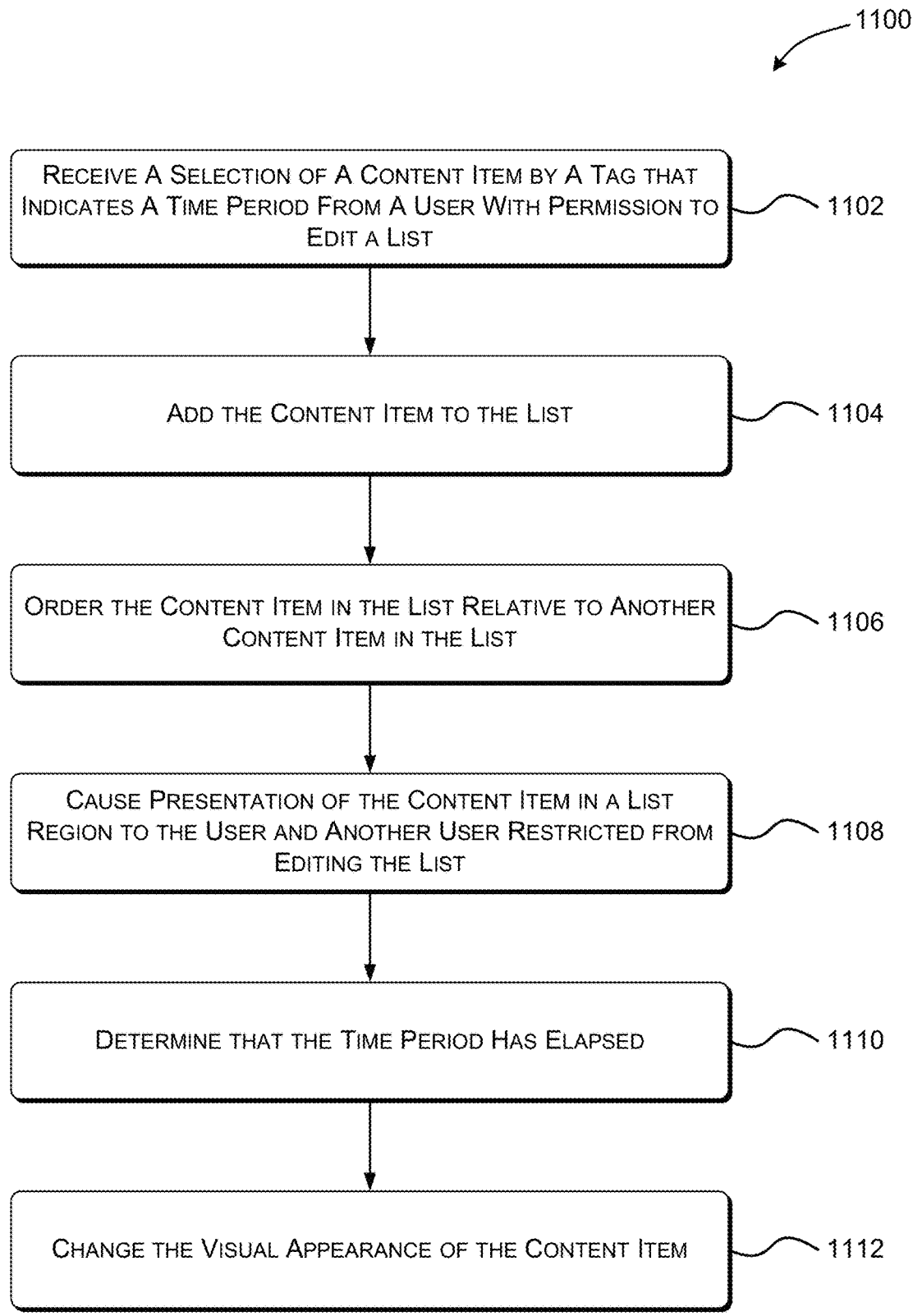
FIG. 11 is a flow diagram showing aspects of a process for increasing the prominence of a content item in the list after a time period associated with the content item has elapsed.

FIGS. 10 and 11 are flow diagrams illustrating routines 1000 and 1100 describing aspects of the present disclosure. In various examples, operations of the routines 1000 and 1100 can be performed by the list management module 116 of the server 114. The logical operations described herein with regard to FIG. 10 and FIG. 11 can be implemented (1) as a sequence of computer-implemented acts or program modules running on a computing device and/or (2) as interconnected machine logic circuits or circuit modules within a computing device.

For ease of understanding, the processes discussed in this disclosure are delineated as separate operations represented as independent blocks. However, these separately delineated operations should not be construed as necessarily order dependent in their performance. The order in which the process is described is not intended to be construed as a limitation, and any number of the described process blocks may be combined in any order to implement the process or an alternate process. Moreover, it is also possible that one or more of the provided operations is modified or omitted.

The particular implementation of the technologies disclosed herein is a matter of choice dependent on the performance and other requirements of the computing device. Accordingly, the logical operations described herein are referred to variously as states, operations, structural devices, acts, or modules. These states, operations, structural devices, acts, and modules can be implemented in hardware, software, firmware, in special-purpose digital logic, and any combination thereof. It should be appreciated that more or fewer operations can be performed than shown in the figures and described herein. These operations can also be performed in a different order than those described herein.

It also should be understood that the illustrated methods can end at any time and need not be performed in their entireties. Some or all operations of the methods, and/or substantially equivalent operations, can be performed by execution of computer-readable instructions included on a computer-readable media, as defined below. The term "computer-readable instructions," and variants thereof, as used in the description and claims, is used expansively herein to include routines, applications, application modules, program modules, programs, components, data structures, algorithms, and the like. Computer-readable instructions can be implemented on various system configurations, including processing units in single-processor or multiprocessor systems, minicomputers, mainframe computers, personal computers, hand-held computing devices, microprocessor-based, programmable consumer electronics, combinations thereof, and the like.

For example, the operations of the routines 1000 or 1100 can be implemented by dynamically linked libraries ("DLLs"), statically linked libraries, functionality produced by an application programming interface ("API"), a compiled program, an interpreted program, a script, a network service or site, or any other executable set of instructions. Data can be stored in a data structure in one or more memory components. Data can be retrieved from the data structure by addressing links or references to the data structure.

Although the following illustration may refer to the components of the figures, it can be appreciated that the operations of the routines 1000 and 1100 may be also implemented in many other ways. For example, the routines 1000 and 1100 may be implemented, at least in part, by another remote computer, processor, or circuit. In addition, one or more of the operations of the routines 1000 and 1100 may alternatively or additionally be implemented, at least in part, by a chipset working alone or in conjunction with other software modules. In the examples described below, one or more modules of a computing system can receive and/or process the data disclosed herein. Any service, circuit, or application suitable for providing the techniques disclosed herein can be used in operations described herein.

With reference to FIG. 10, the routine 1000 begins at operation 1002 where a selection of a content item is received from a first user. The first user has one or more permissions that allow the first user to edit a list of content items. The one or more permissions may also restrict a second user from editing the list. The content item may be displayed on a main region of a shared UI that is accessed and manipulated by multiple users. Permissions associated with the shared UI may allow any user to edit content items on the shared UI. The shared UI may be presented as part of a communication session between multiple users.

The content item may be a hand-drawn marking, text, an image, a file icon representing a file or executable application, or the like. The content item may be selected by any type of user interaction with the shared UI including, but not limited to, association of a tag with the content item or movement of the content item from the main region of the shared UI to a list region of the shared UI. In some configurations, the first user may be a moderator. The moderator may be the only user among the participants in the communication session with permission to edit the list.

At operation 1004, the content item is added to the list. The list may be implemented as a data structure that is maintained on a server or other computing device. The list may contain multiple content items generated during the communication session or added to the communication session. In some configurations, the content item may be added to the list by adding a link to the content item to the list. This may save memory and bandwidth by storing and sending a relatively smaller set of data representing the link rather than the entire content item. Using a link may also allow updating the content item in the list to reflect changes made to the content item in the main region of the shared UI.

At operation 1006, the content item is ordered in the list relative to another content item in the list. The list may be maintained as an ordered list in which each content item has a unique position relative to the other content items. The ordering may be based on a characteristic of the content item. The characteristic may be derived from the content item during the ordering of the list. The characteristic may be obtained from metadata associated with the content item. Any common characteristic shared among the content items in the list may be used to order the list. For example, the characteristic may be an identity of a user who contributed the content item, a timestamp, a priority label, a type label, or the like. Examples of various ways to order content items in the list are shown in FIGS. 6A-6D.

At operation 1008, presentation of the list in a list region of the shared UI is caused by a computer system. The computer system may be a digital whiteboard, a laptop computer, a desktop computer, a tablet, or another computer system that includes a display device and directly displays the shared UI. However, the computer system may be implemented as a server or other computing device that does not directly display the shared UI but rather generates instructions, commands, or data that causes a different computer device to present the list region on the shared UI.

The shared UI is displayed to multiple users including the first user (who has permission to edit the list) and the second user who is restricted from editing the list by the permissions. By setting more restrictive permissions for editing the list (and list region) than for other regions of the shared UI, it is easier to impose a structure and organization on the list region simply because fewer users are able to change its contents. The list region may, of course, be displayed to multiple other users besides the first user and the second user.

At operation 1010, display of the content item in the main region of the shared UI may cease in response to addition of the content item to the list. Cessation of display of the content item may be caused, for example, by the list management module 116 shown in FIG. 1 sending instructions to a computing device that is displaying the shared UI. An example of removing the content item from the main region of the shared UI (i.e., ceasing display) when added to the list is shown in FIG. 2.

At operation 1012, an agenda for the communication session may be modified by adding the content item to the agenda. The content item may be added "manually" by a moderator or other user moving the content item from the list region to the agenda. Alternatively, in response to receiving an indication that an agenda item of the agenda is completed (e.g., the moderator checking a box associated with the agenda item), the list may be evaluated by a computer system to determine if the list contains any content items. If it is determined that there is a content item or items remaining in the list, the computer system may add the content item(s) to the agenda. This provides an additional opportunity to discuss any content items remain in the list. An example of adding a content item to an agenda is shown in FIG. 7.

At operation 1014, a communication from a moderator of the communication session to a user who contributed a content item may be generated. This communication may be a "thank you" note or otherwise recognize the contribution. The communication may be generated on a UI of a moderator computing device. The communication may contain pre-populated content referencing the content item. Use of pre-populated content such as content included in a form letter or template may make it easier for the moderator to generate the communication and may reduce opportunities for data entry error. An example of an architecture for generating this type of communication is shown in FIG. 8.

With reference to FIG. 11, the routine 1100 begins at operation 1102 where a selection of a content item is received from a first user. The first user has one or more permissions that allow the first user to edit a list of content items. The one or more permissions may also restrict a second user from editing the list. The selection is indicated by the first user placing a tag in or near the content item on the main region of the shared UI. The tag indicates a time period that is tracked by a countdown timer once the content item is "tagged" and added to the list. An example of tagging a content item with a time period is shown in FIG. 4.

At operation 1104, the content item is added to the list. The list may be implemented as a data structure that is maintained on a server or other computing device. The list may contain multiple content items generated during the communication session or added to the communication session. Other content items in the list may or may not be associated with time periods and countdown timers. In some configurations, the content item may be added to the list by adding a link to the content item to the list. This may save memory and bandwidth by storing and sending a relatively smaller set of data representing the link rather than the entire content item. Using a link may also allow updating the content item in the list to reflect changes made to the content item in the main region of the shared UI.

At operation 1106, the content item is ordered in the list relative to another content item in the list. The list may be maintained as an ordered list in which each content item has a unique position relative to the other content items. The ordering may be based on a characteristic of the content item. The characteristic may be derived from the content item during the ordering of the list. The characteristic may be obtained from metadata associated with the content item. Any common characteristic shared among the content items in the list may be used to order the list. For example, the amount of time remaining on countdown timers may be used to order the list. A content item with the shortest amount of the remaining time may be at the top of the list. An example of ordering the list based on a time ranking is shown in FIG. 6B.

At operation 1108, presentation of the list in a list region of the shared UI is caused by a computer system. The computer system may be a digital whiteboard, a laptop computer, a desktop computer, a tablet, or another computer system that includes a display device and directly displays the shared UI. However, the computer system may be implemented as a server or other computing device that does not directly display the shared UI but rather generates instructions, commands, or data that causes a different computer device to present the list region on the shared UI.

The shared UI is displayed to multiple users including the first user (who has permission to edit the list) and the second user, who is restricted from editing the list by the permissions. By setting more restrictive permissions for editing the list (and list region) than for other regions of the shared UI, it is easier to impose a structure and organization on the list region simply because fewer users are able to change its contents. The list region may, of course, be displayed to multiple other users besides the first user and the second user.

At operation 1110, it is determined that the time period indicated at operation 1102 has elapsed. The time period elapses when the remaining time on associated countdown timer reaches zero. The countdown timer may be implemented in part using a clock provided by a computing device that displays the list region, by the server 114 shown in FIG. 1, or by a network-accessible time source such as the National Institute of Standards and Technology.

At operation 1112, the visual appearance of the content item is changed after the time period elapses (i.e., the countdown timer reaches zero). The visual appearance of the content item may be changed to increase its prominence so that it is noticed by participants of the communication session. The visual appearance of the content item may be changed by showing there is no time remaining on the countdown timer, by bolding or highlighting, by moving or vibrating, by enlarging, by displaying in a pop-up window, or by another technique. Examples of changing the visual appearance of the content item are shown in FIGS. 5A-D.

Figure 12:
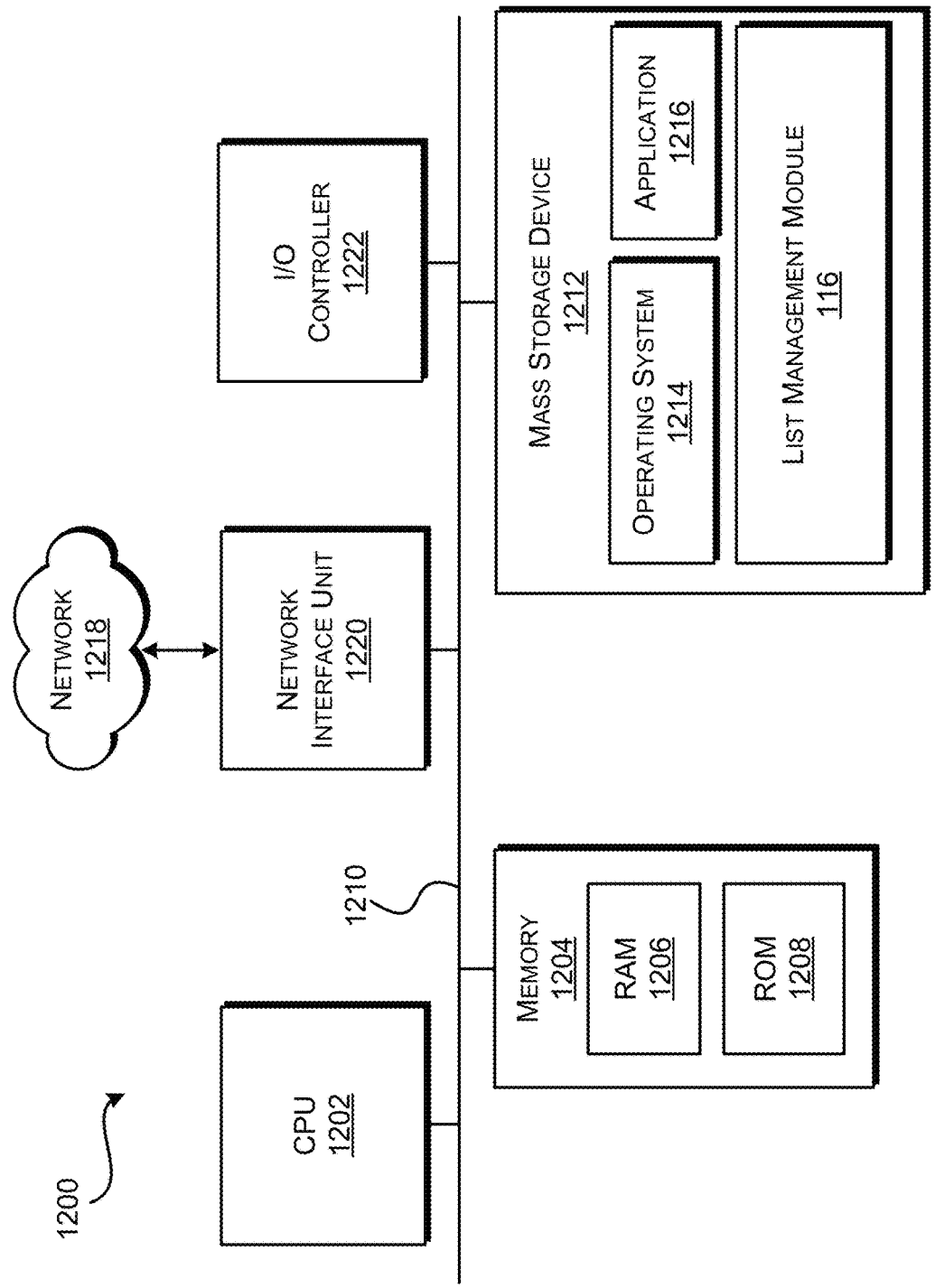
FIG. 12 is a computer architecture diagram illustrating an illustrative computer hardware and software architecture for a computing system capable of implementing aspects of the techniques and technologies presented herein.

FIG. 12 shows additional details of an example computer architecture 1200 for a computer, such as the digital whiteboard 102, server 114, remote computing device 126, and/or the moderator computing device 132 shown in FIG. 1, capable of executing the program components described herein. Thus, the computer architecture 1200 illustrated in FIG. 12 illustrates an architecture for a server computer, a mobile phone, a personal digital assistant (PDA), a smartphone, a desktop computer, a collaborative computing device, a netbook computer, a tablet computer, and/or a laptop computer. The computer architecture 1200 may be utilized to execute any aspects of the software components presented herein.

The computer architecture 1200 illustrated in FIG. 12 includes a central processing unit 1202 ("CPU"), a system memory 1204, including a random access memory 1206 ("RAM") and a read-only memory ("ROM") 1208, and a system bus 1210 that couples the memory 1204 to the CPU 1202. A basic input/output system containing the basic routines that help to transfer information between elements within the computer architecture 1200, such as during startup, is stored in the ROM 1208. The computer architecture 1200 further includes a mass storage device 1212 for storing an operating system 1214, an application 1216, the list management module 116, and other data, applications, or programs described herein.

The mass storage device 1212 is connected to the CPU 1202 through a mass storage controller (not shown in FIG. 12) connected to the bus 1210. The mass storage device 1212 and its associated computer-readable media provide non-volatile storage for the computer architecture 1200. Although the description of computer-readable media contained herein refers to a mass storage device, such as a solid-state drive, a hard disk or a CD-ROM drive, it should be appreciated by those skilled in the art that computer-readable media can be any available computer-readable storage media or communication media that can be accessed by the computer architecture 1200.

Communication media includes computer-readable instructions, data structures, program modules, or other data in a modulated data signal such as a carrier wave or other transport mechanism and includes any delivery media. The term "modulated data signal" means a signal that has one or more of its characteristics changed or set in a manner so as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

By way of example, and not limitation, computer-readable storage media may include volatile, non-volatile, removable, and non-removable media implemented in any method or technology for storage of information such as computer-readable instructions, data structures, program modules or other data. For example, computer-readable storage media includes, but is not limited to, RAM, ROM, EPROM, EEPROM, flash memory or other solid-state memory technology, CD-ROM, digital versatile disks ("DVD"), HD-DVD, BLU-RAY, 4K Ultra HD BLU-RAY, or other optical storage, magnetic cassettes, magnetic tape, magnetic disk storage or other magnetic storage devices, or any other medium which can be used to store the desired information, and which can be accessed by the computer architecture 1200. For purposes of the claims, the phrase "computer storage medium," "computer-readable storage medium" and variations thereof, does not include waves, signals, and/or other transitory and/or intangible communication media, per se.

According to various configurations, the computer architecture 1200 may operate in a networked environment using logical connections to remote computers through the network 1218. The computer architecture 1200 may connect to the network 1218 through a network interface unit 1220 connected to the bus 1210. The computer architecture 1200 also may include an input/output controller 1222 for receiving and processing input from a number of other devices, including a keyboard, mouse, touchscreen, electronic stylus, or pen. Similarly, the input/output controller 1222 may provide output to a display screen, a printer, or another type of output device.

The software components described herein may, when loaded into the CPU 1202 and executed, transform the CPU 1202 and the overall computer architecture 1200 from a general-purpose computing system into a special-purpose computing system customized to facilitate the functionality presented herein. The CPU 1202 may be constructed from any number of transistors or other discrete circuit elements, which may individually or collectively assume any number of states. More specifically, the CPU 1202 may operate as a finite-state machine, in response to executable instructions contained within the software modules disclosed herein. These computer-executable instructions may transform the CPU 1202 by specifying how the CPU 1202 transitions between states, thereby transforming the transistors or other discrete hardware elements constituting the CPU 1202.

Encoding the software modules presented herein also may transform the physical structure of the computer-readable media presented herein. The specific transformation of physical structure may depend on various factors, in different implementations of this description. Examples of such factors may include, but are not limited to, the technology used to implement the computer-readable media, whether the computer-readable media is characterized as primary or secondary storage, and the like. For example, if the computer-readable media is implemented as semiconductor-based memory, the software disclosed herein may be encoded on the computer-readable media by transforming the physical state of the semiconductor memory. For example, the software may transform the state of transistors, capacitors, or other discrete circuit elements constituting the semiconductor memory. The software also may transform the physical state of such components in order to store data thereupon.

As another example, the computer-readable media disclosed herein may be implemented using magnetic or optical technology. In such implementations, the software presented herein may transform the physical state of magnetic or optical media, when the software is encoded therein. These transformations may include altering the magnetic characteristics of particular locations within given magnetic media. These transformations also may include altering the physical features or characteristics of particular locations within given optical media, to change the optical characteristics of those locations. Other transformations of physical media are possible without departing from the scope and spirit of the present description, with the foregoing examples provided only to facilitate this discussion.

In light of the above, it should be appreciated that many types of physical transformations take place in the computer architecture 1200 in order to store and execute the software components presented herein. It also should be appreciated that the computer architecture 1200 may include other types of computing devices, including hand-held computers, embedded computer systems, personal digital assistants, and other types of computing devices known to those skilled in the art. It is also contemplated that the computer architecture 1200 may not include all of the components shown in FIG. 12, may include other components that are not explicitly shown in FIG. 12, or may utilize an architecture completely different than that shown in FIG. 12.

Figure 13:
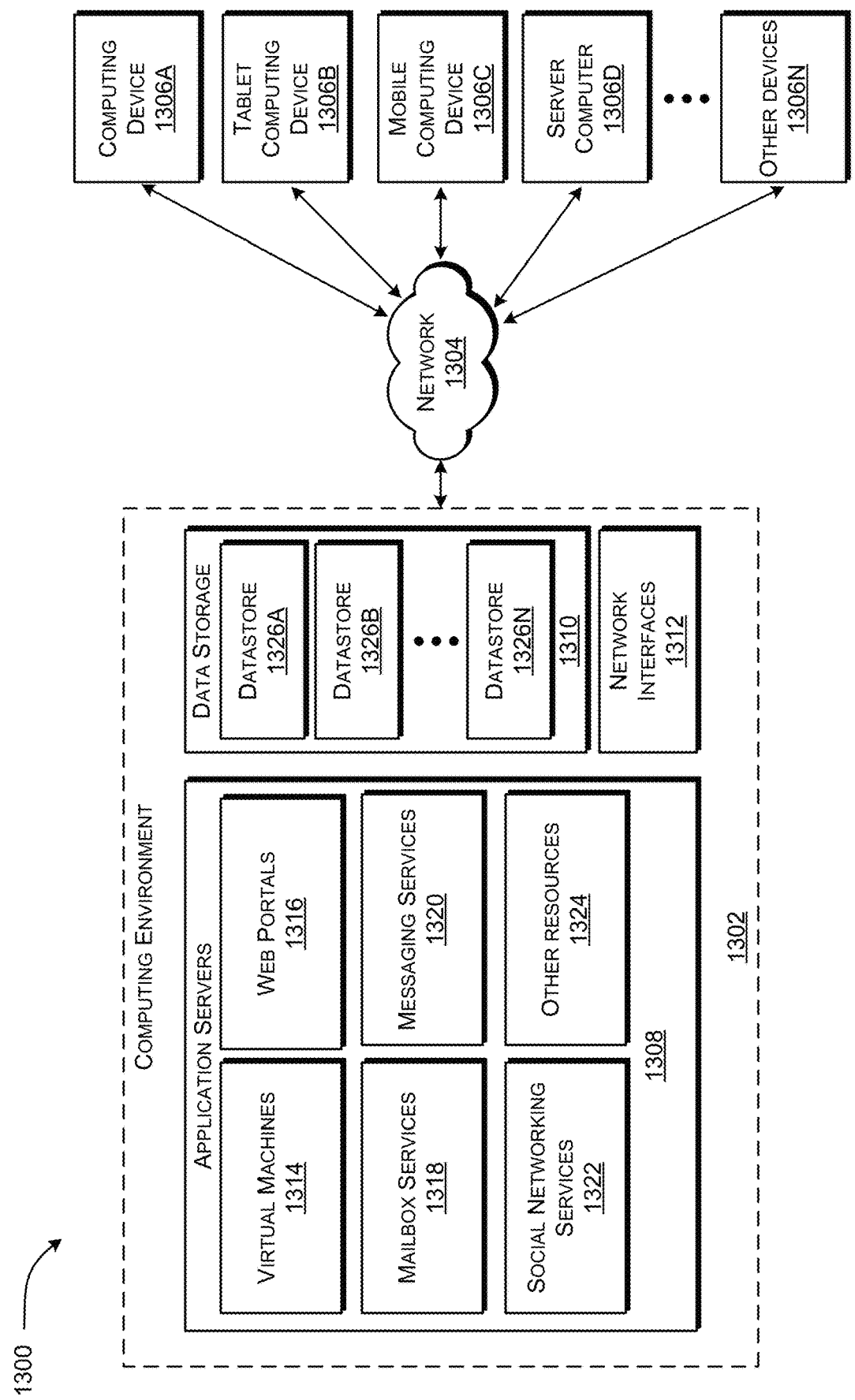
FIG. 13 is a diagram illustrating a distributed computing environment capable of implementing aspects of the techniques and technologies presented herein.

FIG. 13 depicts an illustrative distributed computing environment 1300 capable of executing the software components described herein. Thus, the distributed computing environment 1300 illustrated in FIG. 13 can be utilized to execute any aspects of the software components presented herein.

According to various implementations, the distributed computing environment 1300 includes a computing environment 1302 operating on, in communication with, or as part of the network 1304. One or more client devices 1306A-1006N (hereinafter referred to collectively and/or generically as "clients 1306" and also referred to herein as computing devices 1306) can communicate with the computing environment 1302 via the network 1304.

In one illustrated configuration, the clients 1306 include a computing device 1306A such as a laptop computer, a desktop computer, a collaborative computing device, or other computing device; a slate or tablet computing device ("tablet computing device") 1306B; a mobile computing device 1306C such as a mobile telephone, a smartphone, or other mobile computing device; a server computer 1306D; and/or other devices 1306N. It should be understood that any number of clients 1306 can communicate with the computing environment 1302.

In the illustrated configuration, the computing environment 1302 includes application servers 1308, data storage 1310, and one or more network interfaces 1312. According to various implementations, the functionality of the application servers 1308 can be provided by one or more server computers that are executing as part of, or in communication with, the network 1304. The application servers 1308 can host various services, virtual machines, portals, and/or other resources.

In the illustrated configuration, the application servers 1308 host one or more virtual machines 1314 for hosting applications or other functionality. According to various implementations, the virtual machines 1314 host one or more applications and/or software modules for implementing aspects of the functionality disclosed herein. It should be understood that this configuration is illustrative and should not be construed as being limiting in any way. The application servers 1308 can also host or provide access to one or more portals, link pages, Web sites, and/or other information ("Web Portals 1316").

According to various implementations, the application servers 1308 also include one or more mailbox services 1318 and one or more messaging services 1320. The mailbox services 1318 can include electronic mail ("email") services. The mailbox services 1318 also can include various personal information management ("PIM") and presence services including, but not limited to, calendar services, contact management services, collaboration services, and/or other services. The messaging services 1320 can include, but are not limited to, video conferencing services, audio conferencing services, instant messaging services, chat services, forum services, and/or other communication services.

The application servers 1308 also may include one or more social networking services 1322. The social networking services 1322 can include various social networking services including, but not limited to, services for sharing or posting status updates, instant messages, links, photos, videos, and/or other information; services for commenting or displaying interest in articles, products, blogs, or other resources; and/or other services.

As shown in FIG. 13, the application servers 1308 also can host other services, applications, portals, and/or other resources ("other resources") 1324. The other resources 1324 can include, but are not limited to, workspace collaboration, document sharing, rendering or any other functionality. It thus can be appreciated that the computing environment 1302 can provide integration of the concepts and technologies disclosed herein with various mailbox, messaging, social networking, and/or other services or resources.

As mentioned above, the computing environment 1302 can include the data storage 1310. According to various implementations, the functionality of the data storage 1310 is provided by one or more databases operating on, or in communication with, the network 1304. The functionality of the data storage 1310 also can be provided by one or more server computers configured to host data for the computing environment 1302. The data storage 1310 can include, host, or provide one or more real or virtual datastores 1326A-1026N (hereinafter referred to collectively and/or generically as "datastores 1326").

The datastores 1326 are configured to host data used or created by the application servers 1308 and/or other data. Although not illustrated in FIG. 13, the datastores 1326 also can host or store web page documents, word documents, presentation documents, data structures, algorithms for execution by a recommendation engine, and/or other data utilized by any application program or another module. Aspects of the datastores 1326 may be associated with a service for storing data units such as files.

The computing environment 1302 can communicate with, or be accessed by, the network interfaces 1312. The network interfaces 1312 can include various types of network hardware and software for supporting communications between two or more computing devices including, but not limited to, the computing devices and the servers. It should be appreciated that the network interfaces 1312 also may be utilized to connect to other types of networks and/or computer systems.

It should be understood that the distributed computing environment 1300 described herein can provide any aspects of the software elements described herein with any number of virtual computing resources and/or other distributed computing functionality that can be configured to execute any aspects of the software components disclosed herein. According to various implementations of the concepts and technologies disclosed herein, the distributed computing environment 1300 provides the software functionality described herein as a service to the computing devices. It should also be understood that the computing devices can include real or virtual machines including, but not limited to, server computers, web servers, personal computers, mobile computing devices, smartphones, and/or other devices. As such, various configurations of the concepts and technologies disclosed herein enable any device configured to access the distributed computing environment 1300 to utilize the functionality described herein for providing the techniques disclosed herein, among other aspects. In one specific example, as summarized above, techniques described herein may be implemented, at least in part, by a web browser application, which works in conjunction with the application servers 1308 of FIG. 13.

The disclosure presented herein also encompasses the subject matter set forth in the following clauses.

Clause 1. A method of arranging content items on a shared user interface (UI) (104) displayed as part of a communication session, the method comprising: receiving a selection of a content item (108) displayed on a main region (106) of the shared UI (104) by a first user, wherein the main region (106) of the shared UI (104) is editable by the first user and a second user and one or more permissions associated with a list (118) allow the first user to edit the list (118) but restrict the second user from editing the list (118); adding the content item (108) to the list (118); ordering the content item (108) relative to another content item (602, 606, 610, 614) in the list (118) based on a characteristic (120) of the content item (108); and causing presentation of the list (118) in a list region (110) of the shared UI (104), wherein the list region (110) is displayed to the first user and to the second user.

Clause 2. The method of clause 1, wherein the content item comprises a hand-drawn marking, text, an image, or a file icon.

Clause 3. The method of any of clauses 1-2, wherein the selection comprises association of a tag with the content item on the shared UI or movement of the content item from the main region of the shared UI to the list region of the shared UI.

Clause 4. The method of clause 3, wherein the tag associated with the content item indicates a time period.

Clause 5. The method of clause 4, further comprising changing a visual appearance of the content item on the shared UI after the time period elapses.

Clause 6. The method of any of clauses 1-5, wherein adding the content item to the list comprises adding a link to the content item to the list.

Clause 7. The method of any of clauses 1-6, wherein the characteristic of the content item comprises an identity of a user that contributed the content item, a timestamp, a priority label, or a type label.

Clause 8. The method of any of clauses 1-7, further comprising generating a communication from a moderator of the communication session to a user that created the content item, the communication containing pre-populated content referencing the content item.

Clause 9. The method of any of clauses 1-8, further comprising causing cessation of display of the content item on the main region of the shared UI after adding the content item to the list.

Clause 10. The method of any of clauses 1-9, further comprising modifying an agenda for the communication session by adding the content item to the agenda.

Clause 11. The method of any of clauses 1-9, further comprising, responsive to receiving an indication that an agenda item in an agenda for the communication session is completed, determining that the content item is included in the list and adding the content item to the agenda.

Clause 12. A system for arranging content items on a shared user interface (UI) (104) comprising: one or more processing units; and a computer-readable medium having computer-executable instructions encoded thereon to cause the one or more processing units to: receive a selection of a content item (108) displayed on a main region (106) of the shared UI (104) by a first user, wherein the main region (106) of the shared UI (104) is editable by the first user and a second user and one or more permissions associated with a list (118) allow the first user to edit the list (118) but restrict the second user from editing the list (118); add the content item (108) to the list (118); order the content item (108) relative to another content item (602, 606, 610, 614) in the list (118) based on a characteristic (120) of the content item (108); and cause presentation of the list (118) including the content item (108) in a list region (110) of the shared UI (104), wherein the list region (110) is displayed to the first user and to the second user.

Clause 13. The system of clause 12, further comprising a digital whiteboard, wherein the shared UI is presented on the digital whiteboard.

Clause 14. The system of clause 13, wherein the shared UI comprises an infinite canvas.

Clause 15. The system of clause 14, wherein the computer-executable instructions further cause the one or more processing units to adjust a size or a position of the list region relative to the infinite canvas to maintain the list region at a constant size and position on a display device of the digital whiteboard.

Clause 16. The system of any of clauses 12-15, further comprising a network connection to a remote computing device and wherein the main region of the shared UI is included in a communication session between at least the system and the remote computing device.

Clause 17. A computer-readable storage medium having computer-executable instructions encoded thereon to cause a computing device to: receive a selection of a content item (108) displayed on a main region (106) of a shared UI in a communication session by a first user, wherein the main region (106) of the shared UI (104) is editable by the first user and a second user and one or more permissions associated with a list (118) allow the first user to edit the list (118); add the content item (108) to the list; order the content item (108) relative to another content item (602, 606, 610, 614) in the list (118) based on a characteristic (120) of the content item (108); and cause presentation of the list (118) in a list region (110) of the shared UI (104), wherein the list region (110) is displayed to the first user and the one or more permissions restrict display of the list region (110) to a second user.

Clause 18. The computer-readable storage medium of clause 17, wherein the list region includes identification of a user that contributed the content item.

Clause 19. The computer-readable storage medium of any of clauses 17-18, wherein the computer-executable instructions further cause the computing device to receive an indication of a priority label or a type label from a computing device associated with the first user and wherein the characteristic of the content item comprises the priority label or the type label.

Clause 20. The computer-readable storage medium of any of clauses 17-19, wherein the computing device is a moderator computing device, the first user is a moderator, and the computer-executable instructions further cause the computing device to adjust a size of the list region based on a dimension of a display device of the moderator computing device.

The terms "a," "an," "the" and similar referents used in the context of describing the invention including in the following claims are to be construed to cover both the singular and the plural unless otherwise indicated herein or clearly contradicted by context. The terms "based on," "based upon," and similar referents are to be construed as meaning "based at least in part" which includes being "based in part" and "based in whole" unless otherwise indicated or clearly contradicted by context.

It should be appreciated that any reference to "first," "second," etc. users or other elements within the Summary and/or Detailed Description is not intended to and should not be construed to necessarily correspond to any reference of "first," "second," etc. elements of the claims. Rather, any use of "first" and "second" within the Summary, Detailed Description, and/or claims may be used to distinguish between two different instances of the same element (e.g., two different users, two computing devices, etc.).

In closing, although the various configurations have been described in language specific to structural features and/or methodological acts, it is to be understood that the subject matter defined in the appended representations is not necessarily limited to the specific features or acts described.

Rather, the specific features and acts are disclosed as example forms of implementing the claimed subject matter. All examples are provided for illustrative purposes and are not to be construed as limiting the scope of the claims.

The invention claimed is:

1. A method of arranging content items on a shared user interface (UI) displayed as part of a communication session, the method comprising:
receiving a selection of a content item displayed on a main region of the shared UI by a first user, wherein the main region of the shared UI is editable by the first user and a second user;
adding the content item to a list displayed in a list region of the shared UI, wherein one or more permissions associated with the list allow the first user to edit the list region but restrict the second user from editing the list region and wherein the list region is displayed to the first user and to the second user;
ordering the content item relative to another content item in the list based on a characteristic of the content item; and
causing presentation of the list in the list region of the shared UI.

2. The method of claim 1, wherein the content item comprises a hand-drawn marking, text, an image, or a file icon.

3. The method of claim 1, wherein the selection comprises association of a tag with the content item on the shared UI or movement of the content item from the main region of the shared UI to the list region of the shared UI.

4. The method of claim 3, wherein the tag associated with the content item indicates a time period.

5. The method of claim 4, further comprising changing a visual appearance of the content item on the shared UI after the time period elapses.

6. The method of claim 1, wherein adding the content item to the list comprises adding a link to the content item to the list.

7. The method of claim 1, wherein the characteristic of the content item comprises an identity of a user that contributed the content item, a timestamp, a priority label, or a type label.

8. The method of claim 1, further comprising generating a communication from a moderator of the communication session to a user that created the content item, the communication containing pre-populated content referencing the content item.

9. The method of claim 1, further comprising causing cessation of display of the content item on the main region of the shared UI after adding the content item to the list.

10. The method of claim 1, further comprising modifying an agenda for the communication session by adding the content item to the agenda.

11. The method of claim 1, further comprising, responsive to receiving an indication that an agenda item in an agenda for the communication session is completed, determining that the content item is included in the list and adding the content item to the agenda.

12. A system for arranging content items on a shared user interface (UI) comprising:
one or more processing units; and
a computer-readable medium having computer-executable instructions encoded thereon to cause the one or more processing units to:
receive a selection of a content item displayed on a main region of the shared UI by a first user, wherein the main region of the shared UI is editable by the first user and a second user and one or more permissions associated with a list allow the first user to edit the list but restrict the second user from editing the list;
add the content item to the list;
order the content item relative to another content item in the list based on a characteristic of the content item; and
cause presentation of the list including the content item in a list region of the shared UI, wherein the list region is displayed to the first user and to the second user.

13. The system of claim 12, further comprising a digital whiteboard, wherein the shared UI is presented on the digital whiteboard.

14. The system of claim 13, wherein the shared UI comprises an infinite canvas.

15. The system of claim 14, wherein the computer-executable instructions further cause the one or more processing units to adjust a size or a position of the list region relative to the infinite canvas to maintain the list region at a constant size and position on a display device of the digital whiteboard.

16. The system of claim 12, further comprising a network connection to a remote computing device and wherein the main region of the shared UI is included in a communication session between at least the system and the remote computing device.

17. A computer-readable storage medium having computer-executable instructions encoded thereon to cause a computing device to:
receive a selection of a content item displayed on a main region of a shared UI in a communication session by a first user, wherein the main region of the shared UI is editable by the first user and a second user and one or more permissions associated with a list allow the first user to edit the list but restrict the second user from editing the list;
add the content item to the list;
order the content item relative to another content item in the list based on a characteristic of the content item; and
cause presentation of the list in a list region of the shared UI, wherein the list region is displayed to the first user and the one or more permissions restrict display of the list region to a second user.

18. The computer-readable storage medium of claim 17, wherein the list region includes identification of a user that contributed the content item.

19. The computer-readable storage medium of claim 17, wherein the computer-executable instructions further cause the computing device to receive an indication of a priority label or a type label from a computing device associated with the first user and wherein the characteristic of the content item comprises the priority label or the type label.

20. The computer-readable storage medium of claim 17, wherein the computing device is a moderator computing device, the first user is a moderator, and the computer-executable instructions further cause the computing device to adjust a size of the list region based on a dimension of a display device of the moderator computing device.

* * * * *